(12) United States Patent
Le

(10) Patent No.: US 9,028,587 B2
(45) Date of Patent: May 12, 2015

(54) GALLIUM-68 PURIFICATION

(75) Inventor: Van So Le, Gymea (AU)

(73) Assignee: Australian Nuclear Science and Technology Organisation, Lucas Heights, NSW (AU)

(*) Notice: Subject to any disclaimer, the term of this patent is extended or adjusted under 35 U.S.C. 154(b) by 151 days.

(21) Appl. No.: 13/582,200

(22) PCT Filed: Mar. 3, 2011

(86) PCT No.: PCT/AU2011/000244
§ 371 (c)(1),
(2), (4) Date: Nov. 9, 2012

(87) PCT Pub. No.: WO2011/106846
PCT Pub. Date: Sep. 9, 2011

(65) Prior Publication Data
US 2013/0055855 A1 Mar. 7, 2013

(30) Foreign Application Priority Data
Mar. 3, 2010 (AU) ................................ 2010900900

(51) Int. Cl.
*C22B 58/00* (2006.01)
*B01D 15/36* (2006.01)
*C22B 3/42* (2006.01)

(52) U.S. Cl.
CPC .............. *C22B 58/00* (2013.01); *B01D 15/362* (2013.01); *C22B 3/42* (2013.01)

(58) Field of Classification Search
CPC ......... C22B 58/00; C22B 3/24; B01D 15/362
USPC .............................. 75/711; 210/682; 423/249
See application file for complete search history.

(56) References Cited

U.S. PATENT DOCUMENTS

| | | | |
|---|---|---|---|
| 4,264,468 A | 4/1981 | Neirinckx et al. | |
| 4,288,424 A | 9/1981 | Neirinckx et al. | |
| 4,330,507 A | 5/1982 | Lewis | |
| 5,154,897 A | 10/1992 | Ehrhardt et al. | |
| 7,586,102 B2 | 9/2009 | Mourtada et al. | |
| 8,147,804 B2 | 4/2012 | Roesch et al. | |
| 2008/0277350 A1* | 11/2008 | Roesch et al. | ........... 210/682 |

OTHER PUBLICATIONS

Author Unknown, "A New 68Ge/68Ga Radioisotope Generator System" Technical Notes, Received Nov. 1976 pp. 117-120.

(Continued)

*Primary Examiner* — George Wyszomierski
*Assistant Examiner* — Tima M McGuthry Banks
(74) *Attorney, Agent, or Firm* — Casimir Jones S.C.

(57) ABSTRACT

A method is described for obtaining purified $^{68}$Ga. The method comprises eluting $^{68}$Ga from a sorbent in and/or on which are sorbed $^{68}$Ga and $^{68}$Ge, so as to generate a crude $^{68}$Ga solution. The sorbent should have a higher affinity for $^{68}$Ge than for $^{68}$Ga. The crude $^{68}$Ga solution is then applied to a medium cation exchange resin, and the resin is eluted with an aqueous alcohol so as to retain the $^{68}$Ga on the resin and remove unwanted species from the resin. The resin is then eluted with an eluent, which may be an acidic solution, an alkaline solution or a solution of a species capable of complexing $^{68}$Ga ions, so as to obtain an eluate comprising purified $^{68}$Ga ions.

17 Claims, 17 Drawing Sheets

(56) References Cited

OTHER PUBLICATIONS

Author Unknown, "An Improved Gallium-68 Cow" Technical Notes, Received May 19, 1961 pp. 62-63.
Author Unknown, "Gallium (68Ga) Chloride Solution for Radiolabelling" Pharmeuropa vol. 23 (3), Jul. 2011, pp. 457 and 508.
Aardaneh, K. et al. "Ga2O for Target, Solvent Extraction for Radiochemical Separation and SnO2 for the Preparation of a 68Ge/68Ga Generator" Journal of Radioanalytical and Nuclear Chemistry, vol. 268, No. 1 (2006) pp. 25-32.
Bao, B. et al. "A New 68Ge/68Ga Generator Based on CeO2" J. Radioanal. Nucl. Chem., 1996, Letters, 213 (4) pp. 233-238.
Blois, E. et al. "Characteristics of SnO2-based 68Ge/68Ga generator and aspects of radiolabelling DOTA-peptides" Applied Radiation and Isotopes, 69 (2011) pp. 308-315.
Bokhari, T.H. et al. "Concentration of 68Ga via solvent extraction" Applied Radiation and Isotopes, 67 (2009) pp. 100-102.
Browne, E. et al.: Book "Table of Radioactive Isotopes" Science, 1986, Publisher Wiley, ISBN 047184909X, 9780471849094Length 1056 pages. Three pages of table of contents provided.
Caletka, R. et al. "Separation of Germanium from Some Elements by Adsorption on Silica Gel" Journal of Radioanalytical Chemistry, vol. 21 (1974) pp. 349-353.
Chakravarty, R. et al. "Development of a nano-zirconia based 68Ge/68Ga generator for biomedical applications" Nuclear Medicine and Biology,38 (2011) pp. 575-583.
Egamediev, S. Kh. et. al. "Influence of preliminary treatment of aluminum oxide on the separation of 68Ge-68Ga radionuclide chain" Journal of Radioanalytical and Nuclear Chemistry, vol. 246, No. 3 (2000) 593-596.
Ehrhardt, G. et al. "A New Germanium-68/Gallium-68 Generator" The Journal of Nuclear Medicine, vol. 19 (8), 1978, pp. 925-929.
Gleason, G.I "A Positron Cow" Intl Journal of Applied Radiation and Isotopes, 1960, vol. 8, pp. 90-94.
Kopecky, P. et al. "68Ge-68Ga Generator for the Production of 68Ga in an Ionic Form" Intl Journal of Applied Radiation and Isotopes, 1974, vol. 25, pp. 263-268.
Kopecky, P. et al. "The Study of Conditions for the Preparation and Utilization of 68Ge-68Ga Generator" Intl Journal of Applied Radiation and Isotopes, 1973, vol. 24, pp. 73-80.
Kozlova, M.D. et al. "Development of 68Ge/68Ga Generator in Institute of Biophysics" Journal of Labelled Compounds and Radiopharmaceuticals, Apr. 1994, vol. 35, pp. 282-283.
Le, V.S. et al. "Development of 68Ga Generator at ANSTO", 1st World Congress on Ga-68 and Peptide Receptor Radionuclide Therapy, Theranosticcs, Bad Berka, Germany Jun. 23-26, 2011.
Le, Van So "68Ga Generator Integrated System: Elution-Purification-Concentrataion Integration" Theranostics, Gallium-68, and Other Radionuclides, 2013 pp. 43-75.
Li, Ming-Hsin "A new Ge-68/Ga-68 generator system using a higher sorption capacity resin as adsorbent for Ge-68" J Nucl Med. 2009; 50 (Supplement 2): 2137.
Lievens, P. et al. "Selective removal of germanium by retention on silica gel" Analytica Chimica Acta. 70 (1974) 462-464.
Loc'h, C. "A New Generator for Ionic Gallium-68" J Nucl Med 21: 171-173, 1980.
Loktionova, N.S. et al "Improved colum-based radiochemical processing of the generator produced 68Ga" Applied Radiation and Isotopes 69 (2011) 942-946.
McAlister, D. R. et al. "Automated two column generator systems for medical radionuclides" Applied Radiation and Isotopes 67 (2009) 1985-1991.
McElvany, K. et al. "Comparison of 68Ge/68Ga Generator Systems for Radiopharmaceutical Production" Intl. J. Appl. Radiat. Isot. vol. 35, No. 6, pp. 521-524 1984.
Neirinckx, R. et al. "Development of an Ionic 68Ge-68Ga Generator III. Chelate Resins as Chromatographic Substrates for Germanium" Int. J. Appl. Radiat. Isot. vol. 33, pp. 259 to 266, 1982.
Neirinckx, R. et al. "Potential Column Chormatography for Ionic Ga-68. II: Organic Ion Exchangers as Chromatographic Supports" J Nucl Med 21: 81-83, 1980.
Neirinckx, R. et al. "Potential Column Chromatography Generators for Ionic Ga-68. I. Inogranic Substrates" J Nucl Med 20: 1075-1079, 1979.
Pao, P.J. et al. "A new method for the preparation of 68 Ga-Generators following proton bombardment of gallium oxide targets" Journal of Radioanalytical Chemistry, vol. 64, No. 1-2 (1981) 267-272.
Pawlak, D. et al. "Method for Post-elution Concerntration and Acidity Reduction of Eluate Obtained from SnO2 Based 68Ge/68Ga Generator" World Journal of Nuclear Medicine, vol. 10 (1), Jun. 2011, pp. 78-79.
Schuhmacher, J. et al. "A New 68Ge/68Ga Radioisotope Generator System for Production of 68Ga in Dilute HCl-Authors' reply" Int. J. Appl. Radiat. Isot. vol. 32, p. 527, 1981.
Waters, S.L. "The Application of Hydrous Tin (IV) Oxide in Radiochemical Separations and, in particular, for the 68Ge/68Ga and 82Sr/82Rb Generator Sytems" Int. J. Appl. Radiat. Isot. vol. 34, No. 7, p. 1023, 1983.
Zhernosekov, K. P. et al. "Processing of Generator-Produced 68Ga for Medical Application" J Nucl Med 2007; 48: 1741-1748.
Zoller, F. et al. "Efficient post-processing of aqueous generator eluates facilitates 68Ga-labelling under anhydrous conditions" Radiochim. Acta 98, 157-160 (2010).
Eckerman, K. and Endo, A., Mird: Radionuclide Data and Decay Schemes (2nd Ed.) Society of Nuclear Medicine, Reston, VA, 2008, pp. 117, 121.
Eckerman, Keith F. and Endo, Akira. Mird: Radionuclide Data and Decay Schemes, 2nd Edition (2008), 4 sheets; pp. 116, 117, 120 and 121.

* cited by examiner

⁶⁸Ge/⁶⁸Ga Generator System GAG1-Plus

LED Indicators & Functions

Operation 1, A

| LED | LIGHT | VALE/PUMP |
|---|---|---|
| 7 | ● | V7+P1 |
| 1 | ○ | V5+V6 |
| 2 | ○ | V3 |
| 3 | ○ | V4 |
| 4 | ○ | V1 |
| 5 | ○ | V2+P2 |

Operation 2, B

| LED | LIGHT | VALE/PUMP |
|---|---|---|
| 7 | ● | V7+P1 |
| 1 | ○ | V5+V6 |
| 2 | ● | V3 |
| 3 | ○ | V4 |
| 4 | ○ | V1 |
| 5 | ○ | V2+P2 |

Operation 3, E

| LED | LIGHT | VALE/PUMP |
|---|---|---|
| 7 | ● | V7+P1 |
| 1 | ○ | V5+V6 |
| 2 | ● | V3 |
| 3 | ○ | V4 |
| 4 | ● | V1 |
| 5 | ○ | V2+P2 |

Operation 4, -

| LED | LIGHT | VALE/PUMP |
|---|---|---|
| 7 | ● | V7+P1 |
| 1 | ○ | V5+V6 |
| 2 | ● | V3 |
| 3 | ● | V4 |
| 4 | ● | V1 |
| 5 | ○ | V2+P2 |

Operation 5, C

| LED | LIGHT | VALE/PUMP |
|---|---|---|
| 7 | ○ | V7+P1 |
| 1 | ● | V5+V6 |
| 2 | ● | V3 |
| 3 | ● | V4 |
| 4 | ● | V1 |
| 5 | ● | V2+P2 |

Operation 6, D

| LED | LIGHT | VALE/PUMP |
|---|---|---|
| 7 | ● | V7+P1 |
| 1 | ○ | V5+V6 |
| 2 | ● | V3 |
| 3 | ○ | V4 |
| 4 | ● | V1 |
| 5 | ● | V2+P2 |

Operation 7, E

| LED | LIGHT | VALE/PUMP |
|---|---|---|
| 7 | ● | V7+P1 |
| 1 | ○ | V5+V6 |
| 2 | ● | V3 |
| 3 | ○ | V4 |
| 4 | ● | V1 |
| 5 | ○ | V2+P2 |

Fig. 11

GALLIUM-68 PURIFICATION

TECHNICAL FIELD

The present invention relates to a method and apparatus for purification of $^{68}$Ga.

CROSS-REFERENCE TO RELATED APPLICATIONS

This application is a U.S. §371 National Phase Entry of pending International Patent Application No. PCT/AU2011/000244, International Filing Date Mar. 3, 2011, which claims priority to Australian Provisional Patent Application No. AU2010900900, filed Mar. 3, 2010, the contents of which are incorporated by reference in their entireties.

BACKGROUND OF THE INVENTION

Gallium is known as a second chemotherapy agent, after platinum, due to its high and specific affinity toward tumour tissues. The readiness of the radioactive isotope $^{68}$Ga to couple to small biomolecules makes it a potential alternative to $^{18}$F and $^{11}$C in PET applications. Several chelate compounds developed for radiolabelling of peptides and/or protein entities with metallic radionuclides are well suited to $^{68}$Ga labelling.

$^{68}$Ga is a second important β+ emitter after $^{18}$F and may be efficiently used in PET imaging. It is characterised by high position abundance and good imaging resolution. 89.14% of $^{68}$Ga atoms decay with emission of β+ particles (with the 511 KeV annihilation gamma ray intensity of 178.2%). The 829.5 KeV positron radiation provides a PET imaging resolution of about 2.3 mm (bone)-11.5 mm (lung) for living tissues (compared to 0.65 mm-2.7 mm in the case of $^{18}$F). These values lie well within the system resolution of modern PET cameras (4-5 mm) and even with high resolution PET system (3 mm).

An advantage of use of $^{68}$Ga is that it has no associated gamma impact on PET images. Insignificant amount of associated gamma emissions (0.03407%) from $^{68}$Ga fall into the commonly used PET energy window of 350 to 700 KeV, and so it has almost no impact on PET images. A further advantage is that $^{68}$Ga has good conformation to conventional radiation safety. The $\Gamma_{20\,KeV}$ exposure rate constant is 0.179 μSv·m$^2$/MBq·h (compared to 0.188 μSv·m$^2$/MBq·h for $^{18}$F), thus the use of $^{18}$F standard radiation safety automatic infusion systems is feasible. An additional benefit is its cost-effectiveness and on-demand availability. The long-lived parent nuclide $^{68}$Ge offers a cost-effective precursor for PET imaging applications with a generator shelf-life of about 2 years. $^{68}$Ge/$^{68}$Ga generators also render the $^{68}$Ga based PET radiopharmacy independent of an onsite cyclotron. This means that this generator is ideally suited to on-demand availability of β+ emitters for biomedical experiments and clinical targeting imaging, both in remote PET centres without a cyclotron and also in cyclotron-operating PET centres.

$^{68}$Ga is suitable for kit formulation. It is predicted that $^{68}$Ga may become widely used for PET/CT. Kit formulated precursors along with $^{68}$Ga generators may be provided, similar to the $^{99m}$Tc—in vivo kits, making such generators the mainstay of molecular imaging nuclear medicine in the future.

Demand for a suitable $^{68}$Ga generator in the world market is high and increasing. In 2008, more than 50 PET centres in Europe and over 20 in the Asia Pacific region (4 in Australia) used $^{68}$Ga generators for clinical purposes. The high price of Ga-68 generators is a convincing indicator that domestic production/supply of such generators where a proton bombardment facility is available may be commercially viable.

Presently $^{68}$Ga is used for the preparation of molecular imaging radiopharmaceuticals used for clinical diagnoses and therapy, especially for cancer treatment. For this purpose $^{68}$Ga solution should be concentrated and free of metallic ionic impurities. Currently $^{68}$Ga solution or $^{68}$Ga eluate is produced from a $^{68}$Ge/$^{68}$Ga generator which is commercially available. $^{68}$Ga eluate from current generators is commonly of low $^{68}$Ga concentration and contains a sufficiently high content of metallic ion impurities that preparation of radiopharmaceuticals is impossible. There is therefore a need for a pure $^{68}$Ga solution of high concentration. Such a solution is a pre-requisite for the successful diagnosis and treatment in modern nuclear medicine.

Processes for the purification and concentration of $^{68}$Ga eluate have been developed. One such method uses a strong anionic exchanger resin column for separation and purification. The $^{68}$Ga eluate in this process is adjusted with 8 M HCl solution to 4M HCl before loading onto resin column. $^{68}$Ga retained on this column is then eluted with a small volume of distilled water (F. Mourtada et al., United States Patent No. US 2008/0035542 A1 Feb. 14, 2008; I. Velikyan et al., Bioconjugate Chem., 15, 554-560, (2004)). This method is not capable of removing some important metallic ion impurities, such as Fe$^{3+}$ and Zn$^{2+}$. Also, the apparatus used in the method is complex and sophisticated, and is not amenable to use by non-professional users. Another purification and concentration method has been reported and is currently used, based on retention of $^{68}$Ga$^{3+}$ ions of $^{68}$Ga eluate on a strong cationic ion exchange resin column, and subsequent removal of co-adsorbed impure metallic ions by washing the column with 0.15 M HCl solution containing 80% acetone. Finally, $^{68}$Ga ions are eluted from the resin column with a small volume of 0.015 M HCl solution containing 98% acetone. This method is successful for removing the majority of impure metallic ions, including Fe$^{3+}$ and Zn$^{2+}$. Unfortunately, the acetone solvent readily reacts with the HCl solution to form a polymeric product. Consequently, the purification process will be unsuccessful if the history of the acetone/HCl solution is unknown. The polymeric residue present in the $^{68}$GaCl$_3$ preparation after evaporation of the acetone will affect the labelling radiopharmaceuticals which is usually a biomedical substance. All steps of this purification process were performed manually.

There is therefore a need for an improved method to purify and concentrate Ga-68 for radiopharmaceutical use, and for a simple automated system for conducting the method.

OBJECT OF THE INVENTION

It is the object of the present invention to substantially overcome or at least ameliorate one or more of the above disadvantages. It is a further object to at least partially satisfy the above need.

SUMMARY OF THE INVENTION

In a first aspect of the invention there is provided a method for obtaining purified $^{68}$Ga comprising:
(i) eluting $^{68}$Ga from a sorbent in and/or on which are sorbed $^{68}$Ga and $^{68}$Ge, so as to generate a crude $^{68}$Ga solution, said sorbent having a higher affinity for $^{68}$Ge than for $^{68}$Ga;
(ii) applying the crude $^{68}$Ga solution to a cation exchange resin;

(iii) eluting the resin with an aqueous alcohol solution so as to retain the $^{68}$Ga on the resin and remove unwanted species from the resin; and (iv) eluting the resin with an eluent so as to obtain an eluate comprising purified $^{68}$Ga ions, said eluent being selected from the group consisting of an acidic solution, an alkaline solution and a solution of a species capable of complexing $^{68}$Ga ions.

The following options may be used in conjunction with the first aspect, either individually or in any suitable combination.

The method may comprise allowing $^{68}$Ge, optionally a solution of $^{68}$Ge, to reside in and/or on the sorbent for sufficient time prior to step (i) for conversion of a portion of the $^{68}$Ge to $^{68}$Ga. The sufficient time may be sufficient for about 50% build-up of $^{68}$Ga. It may be about 50 to about 75 minutes. The method may comprise loading $^{68}$Ge, optionally the solution of $^{68}$Ge, into and/or onto the sorbent from a cyclotron-produced carrier-free $^{68}$Ge stock solution.

The eluent used in step (i) may be aqueous. It may be acidic. It may be an aqueous acidic solution. The sorbent may be a radiation resistant sorbent. It may be an inorganic sorbent. It may be a metal oxide sorbent.

The cation exchange resin may have a pKa between about 0 and about 1, or may have a pKa less than about 0.

The aqueous alcohol used in step (iii) may comprise a dissolved salt It may be acidic. It may have a pH of less than about 2. It may comprise a reducing agent. It may be an acidic aqueous alcohol comprising a reducing agent and optionally a dissolved salt. The salt may be a halide salt, e.g. a chloride salt. The salt may be soluble in the aqueous alcohol. The reducing agent may be organic or it may be inorganic. Suitable reducing agents include ascorbic acid or potassium iodide. The alcohol may be methanol or may be ethanol or may be a mixture of these.

Following step (iii) and prior to step (iv) the resin may be washed with a first wash liquid, for example water. Following this washing, (or following step (iii) if the washing is not performed) the cation ion exchange resin column (or elution column: these terms are used interchangeably in the present specification) may be purged with a gas so as to remove excess liquid from the resin therein. This excess liquid may for example be liquid which sits on the surface of the particles of the cation exchange resin and/or liquid between particles of the cation exchange resin.

Following step (iv) the resin may be washed with a second wash liquid in order to remove the eluent from the resin. The wash liquid may be acidic. In the event that the eluent comprises a gallium complexing agent, the second wash liquid may comprise a diluent such as water. In the event that the second wash liquid is not water, the resin may be subsequently washed with the first wash liquid in order to at least partially wash out the second wash liquid.

The method may comprise neutralising or acidifying the eluate comprising purified $^{68}$Ga ions. It may comprise adding a neutralising or acidifying agent or a suitable buffer to said eluate. It may comprise adjusting the pH of the eluate to a desired pH, e.g. to about pH 2 to about pH 5.

The method may be capable of generating an eluate which comprises no $^{68}$Ge. The presence or absence of $^{68}$Ge in this context may be detected by gamma-ray spectroscopy. Thus the method may generate an eluate comprising $^{68}$Ga and a sufficiently low level of $^{68}$Ge that it is undetectable by gamma-ray spectroscopy.

The method may be an automated method.

The method may additionally comprise preparing a radiopharmaceutical preparation from the eluate comprising purified $^{68}$Ga ions. In this case, the method may be considered to be a method for preparing a radiopharmaceutical preparation comprising purified $^{68}$Ga ions.

In an embodiment there is provided a method for obtaining purified $^{68}$Ga comprising:
(i) eluting $^{68}$Ga from a sorbent in and/or on which are sorbed $^{68}$Ga and $^{68}$Ge, so as to generate a crude $^{68}$Ga solution, said sorbent having a higher affinity for $^{68}$Ge than for $^{68}$Ga;
(ii) applying the crude $^{68}$Ga solution to a cation exchange resin;
(iii) eluting the resin with an acidic aqueous solution of methanol and/or ethanol having dissolved chloride and a reducing agent therein, so as to retain the $^{68}$Ga on the resin and remove unwanted species from the resin;
(iii-a) washing the resin with water;
(iii-b) purging the column with air; and
(iv) eluting the resin with an eluent so as to obtain an eluate comprising purified $^{68}$Ga ions, said eluent being selected from the group consisting of an acidic solution, an alkaline solution and a solution of a species capable of complexing $^{68}$Ga ions.

In another embodiment there is provided a method for obtaining purified $^{68}$Ga comprising:
(i) eluting $^{68}$Ga from a sorbent in and/or on which are sorbed $^{68}$Ga and $^{68}$Ge, so as to generate a crude $^{68}$Ga solution, said sorbent having a higher affinity for $^{68}$Ge than for $^{68}$Ga;
(ii) applying the crude $^{68}$Ga solution to a cation exchange resin;
(iii) eluting the resin with an acidic aqueous solution of methanol and/or ethanol having dissolved chloride and reducing agent therein, so as to retain the $^{68}$Ga on the resin and remove unwanted species from the resin;
(iii-a) washing the resin with water;
(iii-b) purging the column with air;
(iv) eluting the resin with an alkaline eluent so as to obtain an eluate comprising purified $^{68}$Ga ions;
(v) washing the resin with an acidic wash liquid; and
(vi) washing the resin with water.

In another embodiment there is provided a method for obtaining purified $^{68}$Ga comprising:
(i) allowing $^{68}$Ge, optionally a solution of $^{68}$Ge, to reside in and/or on a sorbent for sufficient time for conversion of a portion of the $^{68}$Ge to $^{68}$Ga and then eluting the $^{68}$Ga from the sorbent so as to generate a crude $^{68}$Ga solution, said sorbent having a higher affinity for $^{68}$Ge than for $^{68}$Ga;
(ii) applying the crude $^{68}$Ga solution to a cation exchange resin;
(iii) eluting the resin with an acidic aqueous solution of methanol and/or ethanol having dissolved chloride and reducing agent therein, so as to retain the $^{68}$Ga on the resin and remove unwanted species from the resin;
(iii-a) washing the resin with water;
(iii-b) purging the column with air;
(iv) eluting the resin with an alkaline eluent so as to obtain an eluate comprising purified $^{68}$Ga ions;
(v) washing the resin with an acidic wash liquid; and
washing the resin with water.

In a second aspect of the invention there is provided an apparatus for obtaining purified $^{68}$Ga, or for purifying $^{68}$Ga from a solution comprising $^{68}$Ge ions and $^{68}$Ga ions, said apparatus comprising:
(a) a sorbent column containing a sorbent having a higher affinity for $^{68}$Ge than for $^{68}$Ga, said sorbent column comprising a sorbent column inlet and a sorbent column outlet;
(b) an elution column containing a cation exchange resin, said elution column having an elution column inlet and an elution column outlet, wherein the elution column inlet is coupled to the sorbent column outlet;

(c) a contaminant eluent supply system coupled to the elution column inlet for supplying a contaminant eluent to the elution column inlet;

(d) a product eluent supply system coupled to the elution column inlet for supplying a product eluent to said elution column inlet;

(e) an outlet valve coupled to the elution column outlet, wherein, when the outlet valve is in a first position, eluent from the elution column is directed to a waste container and when the outlet valve is in a second position, eluent from the elution column is directed to a product container; and (f) an apparatus controller for controlling operation of the apparatus.

The following options may be used in conjunction with the second aspect, either individually or in any suitable combination.

The apparatus may comprise a neutraliser system coupled to the product container for neutralising or acidifying a solution of $^{68}$Ga ions in said product container or for adjusting said solution to a desired pH. The neutraliser system may comprise a neutralising agent or acidifying agent addition device.

The apparatus may comprise one or more pumps for causing liquids to pass through the sorbent column and/or through the elution column. At least one pump may be located downstream of the elution column so as to cause the liquids to pass through said columns by way of suction from the pump.

The apparatus may comprise an air inlet for allowing air to pass onto and/or through the elution column. It may comprise reservoirs for the eluent used in step (i) of the method, the aqueous alcohol used in step (iii) of the method, optionally for a first wash liquid and optionally for a second wash liquid. These reservoirs may each be coupled to the elution column inlet. There may be valves for controlling the flow of liquids from these reservoirs through the resin. There may be a valve for controlling the flow of air from the air inlet into the elution column.

The apparatus may be supplied with $^{68}$Ge sorbed in and/or on the sorbent column.

The apparatus controller may be capable of controlling one or more (optionally all) valves and/or one or more (optionally all) pumps of the apparatus. The apparatus controller may be programmable. It may be programmed with a series of steps so as to be capable of implementing the method of the first aspect.

In an embodiment there is provided there is provided an apparatus for purifying $^{68}$Ga from a solution comprising $^{68}$Ge ions and $^{68}$Ga ions, said apparatus comprising:

(a) a sorbent column containing an inorganic sorbent having a higher affinity for $^{68}$Ge than for $^{68}$Ga and having $^{68}$Ge sorbed therein and/or thereon, said sorbent column comprising a sorbent column inlet and a sorbent column outlet;

(b) an elution column containing a cation exchange resin, said elution column having an elution column inlet and an elution column outlet, wherein the elution column inlet is coupled to the sorbent column outlet;

(c) a contaminant eluent supply system coupled to the elution column inlet for supplying a contaminant eluent to the elution column inlet;

(c-i) a wash liquid reservoir coupled to the elution column inlet;

(c-ii) an air inlet coupled to the elution column inlet;

(d) a product eluent supply system coupled to the elution column inlet for supplying a product eluent to said elution column inlet;

(e) an outlet valve coupled to the elution column outlet, wherein, when the outlet valve is in a first position, eluent from the elution column is directed to a waste container and when the outlet valve is in a second position, eluent from the elution column is directed to a product container;

(e-i) a pump for drawing liquids through the sorbent column and/or the elution column; and (f) an apparatus controller for controlling operation of the apparatus.

In a third aspect of the invention there is provided an apparatus controller for controlling the apparatus of the second aspect, said apparatus controller being programmed with a series of steps capable of implementing the method of the first aspect. The apparatus controller may be capable of controlling the length (i.e. time) of one or more, optionally each, of the steps. It may be capable of conducting the steps in the order required to implement the method of the first aspect. It may be capable of conducting the steps in sequence.

In a fourth aspect of the invention there is provided a software program for use on an apparatus controller, said software program comprising steps for implementing the method of the first aspect. The software program may comprise timings for one or more, optionally each, of the steps. It may comprise a sequence of said steps.

In a fifth aspect of the invention there is provided the use of an apparatus according to the second aspect for obtaining purified $^{68}$Ga, or for purifying $^{68}$Ga from a solution comprising $^{68}$Ge ions and $^{68}$Ga ions.

BRIEF DESCRIPTION OF THE DRAWINGS

Preferred embodiments of the present invention will now be described, by way of example only, with reference to the accompanying drawings. The drawings illustrate the processes performed by the automated purification and concentration system described herein, which is compatible with the chemical process of purification and concentration of the generator-produced $^{68}$Ga eluate.

FIG. 11: Light Emission Diode (LED) panel on the apparatus of the invention. The LED panel indicates which valves and pumps are operating at any particular time.

DETAILED DESCRIPTION OF THE PREFERRED EMBODIMENTS

Figure 1:
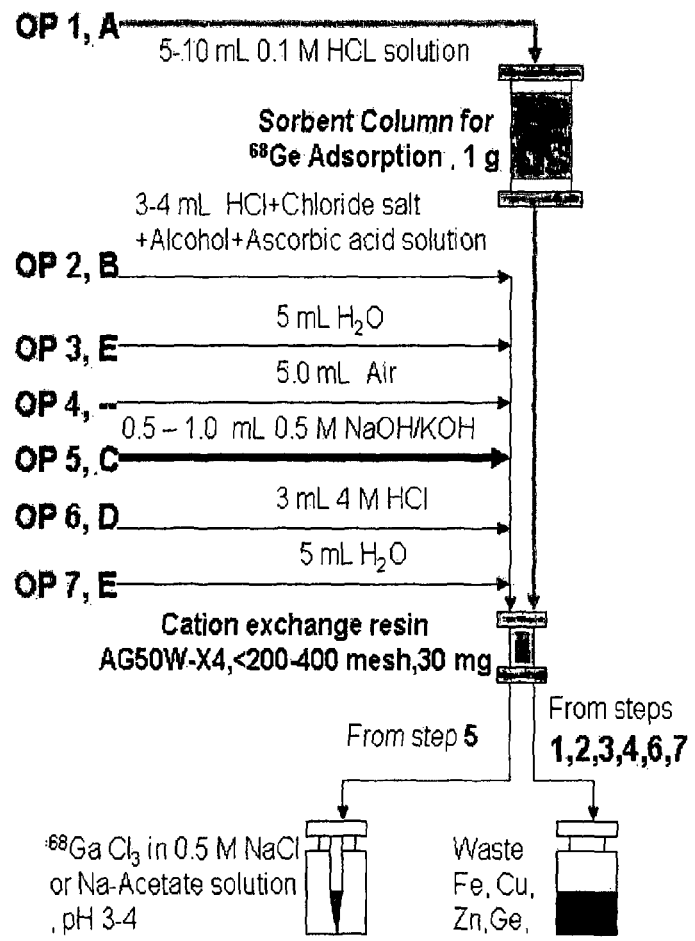
FIG. 1: Process flow chart of $^{68}$Ga purification and concentration apparatus.

In the present specification where reference is made to "$^{68}$Ga" and "$^{68}$Ge", this should not necessarily be taken to refer to the neutral elements, but may refer to ions of these isotopes or to complexes thereof. Thus for example "$^{68}$Ga" should be taken to refer to a $^{68}$Ga species, e.g. $^{68}$Ga$^{3+}$ or a $^{68}$Ga complex, for example a citrate complex. Such complexes may themselves be neutral or may be electrically charged.

In the first step of the method provided herein for obtaining purified $^{68}$Ga, $^{68}$Ga is eluted from a sorbent in and/or on which are sorbed $^{68}$Ga and $^{68}$Ge, so as to generate a crude $^{68}$Ga solution. The sorbent should have a higher affinity for $^{68}$Ge than for $^{68}$Ga so that $^{68}$Ga is eluted from the sorbent while the majority, preferably substantially all, of the $^{68}$Ge is retained on the sorbent. Typically the sorbent is such that the % breakthrough of $^{68}$Ge is less than about $10^{-2}$, or less than about $5*10^{-3}$, $10^{-3}$ or $5*10^{-4}$. The sorbent may have germanium adsorption capacity of at least 1.0 mg Ge per gram sorbent, or at least about 1.5, 2.5, 3, 3.5, 4, 4.5 or 5 mg Ge/g sorbent, or about 1 to about 10 mg Ge/g sorbent, or about 1 to 5, 1 to 2, 2 to 10, 5 to 10, 1.5 to 5, 1.5 to 3 or 2 to 5 mg Ge/g sorbent, e.g. about 1, 1.5, 2, 2.5, 3, 3.5, 4, 4.5, 5, 6, 7, 8, 9 or 10 mg Ge/g sorbent. It may have a higher affinity for $^{68}$Ge than for $^{68}$Ga. The affinity for $^{68}$Ge may be at least about 10 times that for $^{68}$Ga, or at least about 20, 50, 100, 200, 500, 1000, 2000, 5000, 10000, 20000, 50000 or 100000 times that for $^{68}$Ga, or about 10 to about 1000000 times that for $^{68}$Ga or about 10 to 100000, 10 to 10000, 10 to 1000, 10 to 100, 100 to 1000000, 1000 to 1000000, 10000 to 1000000, 100000 to 1000000 or 1000 to 100000 times that for $^{68}$Ga, e.g. about 10, 20, 50, 100, 200, 500, 1000, 2000, 5000, 10000, 20000, 50000, 100000, 200000, 500000 or 1000000 times that for $^{68}$Ga. The sorbent may be an adsorbent or it may be an absorbent, or it may be both. Correspondingly, the gallium and germanium may be adsorbed onto the sorbent, absorbed therein or both. The sorbent should be resistant to radiation, since the $^{68}$Ge typically resides on the column for long periods (commonly days, weeks, months or even years). For this reason the sorbent is commonly an inorganic material for example metal oxide. Suitable sorbents include titanium dioxide and tin oxide sorbents. Sorbents based on mixtures of suitable metal oxides may also be used. Suitable sorbents are described in copending application "Sorbent material" (which is a PCT application claiming priority from AU2010900902), having the same applicant and inventor and the contents of which are incorporated herein by cross-reference. Mixtures of suitable sorbents may also be used. Commonly the sorbents are in particulate form, so that sorbent column contains a packed bed of the particulate sorbent. The sorbent may be porous, e.g. microporous, mesoporous, nanoporous etc. A typical sorbent column may contain about 0.5 to about 2 g of sorbent, or about 0.5 to 1, 1 to 2 or 0.8 to 1.5 g, e.g. about 0.5, 0.6, 0.7, 0.8, 0.9, 1, 1.1, 1.2, 1.3, 1.4, 1.5, 1.6, 1.7, 1.8, 1.9 or 2 g.

The elution of the sorbent is commonly conducted with a mineral acid, commonly an aqueous hydrohalic acid such as hydrochloric acid. Suitable concentrations are about 0.01 to about 1M, or about 0.01 to 0.2, 0.01 to 0.1, 0.01 to 0.05, 0.05 to 1, 0.1 to 1, 0.5 to 1, 0.05 to 0.5 or 0.05 to 0.2, e.g. about 0.01, 0.05, 0.07, 0.08, 0.09, 0.1, 0.15, 0.2, 0.25, 0.3, 0.4, 0.5 or 1M. The amount of eluent used for eluting the sorbent will depend on the mass of sorbent used. The volume may be anywhere from about 2 to about 20 ml, or about 2 to 15, 2 to 10, 2 to 7, 2 to 5, 5 to 20, 5 to 20, 7 to 20, 10 to 20, 5 to 15, 5 to 10, 5 to 7 or 7 to 10 ml, e.g. about 2, 3, 4, 5, 6, 7, 8, 9, 10, 11, 12, 13, 14, 15, 16, 17, 18, 19 or 20 ml.

The method may comprise loading the $^{68}$Ge onto the sorbent. The $^{68}$Ge may be loaded from a cyclotron-produced carrier-free $^{68}$Ge stock solution reservoir. Thus the sorbent column inlet may be couplable to a cyclotron-produced carrier-free $^{68}$Ge stock solution reservoir. It may be coupled to a fitting which may be coupled to a cyclotron-produced carrier-free $^{68}$Ge stock solution reservoir. $^{68}$Ge decays to $^{68}$Ga with half-life of 270.8 days, emitting gamma radiation in the process. $^{68}$Ga in turn decays to $^{68}$Zn with a half-life of 1.1 hours. Thus $^{68}$Ge may be loaded onto the sorbent, where it is retained due to its high affinity for the sorbent, and $^{68}$Ga may be milked from the sorbent column as required. It may be then purified using the elution column as described below. As gallium generated from the germanium decays relatively rapidly to zinc, there is a limit to the amount of zinc that can accumulate on the sorbent. The inventor has found that if a relatively large amount of purified $^{68}$Ga is required, it is more effective to allow only partial build-up of the gallium on the sorbent to occur, commonly about 50% of the maximum, before milking the gallium from the sorbent, and to repeat this several times. This can result in a more satisfactory $^{68}$Ga/$^{68}$Zn ratio and higher overall $^{68}$Ga radioactivity. As the time required to reach 50% of the maximum amount of $^{68}$Ga is about 1.123 hours, this is a suitable period to wait between subsequent elutions of the sorbent. Suitable times are, more broadly, in the range of about 50 to about 75 minutes, or about 50 to 70, 50 to 65, 50 to 60, 55 to 75, 60 to 75, 65 to 75, 60 to 70 or 65 to 75 minutes, e.g. about 50, 55, 60, 65, 66, 67, 68, 69, 70 or 75 minutes.

The solution eluted from the sorbent column, containing $^{68}$Ga and possibly any one or more of zinc, copper, iron, germanium or other elements, is then directly applied to a cation exchange resin. The cation exchange resin may be a porous polymeric ion exchange resin. It may be a medium ion exchange resin. It may have pKa value between about 0 and about 1, or about 0 to 0.5, 0.5 to 1 or 0.3 to 0.7, e.g. about 0, 0.1, 0.2, 0.3, 0.4, 0.5, 0.6, 0.7, 0.8, 0.9 or 1. It may have a pKa value less than about 0, or about 0 to −1, 0 to −0.5 or −0.5 to −1, e.g. about 0, −0.1, −0.2, −0.3, −0.4, −0.5, −0.6, −0.7, −0.8, −0.9 or −1. It may be such that $^{68}$Ga is retained preferentially to other, unwanted, species. The cation exchange resin, prior to being loaded with the crude $^{68}$Ga solution, may be in its protonated or acid form. The cation exchange resin is housed in an elution column. The amount of resin in the column may vary depending on various factors such as the amount of $^{68}$Ge loaded onto the sorbent. The amount of resin may be about 20 to about 150 mg, or about 20 to 100, 20 to 50, 50 to 150, 100 to 150 or 50 to 100 mg, e.g. about 20, 30, 40, 50, 60, 70, 80, 90, 100, 110, 120, 130, 140 or 150 mg. As the residence time of the $^{68}$Ga on the is resin is relatively short, the radiation damage to the resin is relatively small. Thus it is possible to tolerate use of an organic cation exchange resin in this application without unacceptable radiation damage.

The cation exchange resin is then eluted with an aqueous alcohol so as to retain the $^{68}$Ga on the resin and remove unwanted species from the resin. The alcohol is commonly ethanol or methanol. These have the advantage that they have relatively low viscosities, and do not polymerise in the presence of acid or base. The former property is useful in maintaining adequate flow through the system. The latter property is useful in that the final product does not risk being contaminated with polymers. In certain previous methods, acetone was used in elution processes. This solvent has a tendency to polymerise and to thereby contaminate the product. The alcohol may be a non-polymerisable alcohol. It may be an alcohol which is not polymerisable under the influence of gamma-radiation. The alcohol may be about 30 to about 60% in the aqueous alcohol by weight or by volume, or about 30 to 45, 45 to 60 or 40 to 50%, e.g. about 30, 35, 40, 45, 50, 55 or 60% by weight or by volume. The aqueous alcohol may have a salt dissolved therein. The salt may be a halide salt, e.g. a chloride salt. Suitable salts include potassium chloride, sodium chloride and lithium chloride and mixtures of these, as they have suitable solubility in the aqueous alcohol. A further benefit therefore of the use of methanol or ethanol is the ability of an aqueous solution thereof with alcohol concentration of about 30 to about 60% to dissolve a suitable halide salt (or mixture of salts). The salt may be present in the aqueous alcohol at about 0.05 to about 0.5 M, or about 0.2 to 0.5, 0.1 to 0.5, 0.05 to 0.2, 0.05 to 0.4, 0.2 to 0.3, 0.3 to 0.5, 0.4 to 0.5 or 0.3 to 0.4M, e.g. about 0.05, 0.06, 0.07, 0.075, 0.08, 0.09, 0.1, 0.15, 0.2, 0.3, 0.4 or 0.5 M. In the event that a mixture of salts is used, these concentrations may refer to the total salt concentration. The salt may be a source of halide ion to supplement that provided by the liquid used to elute the sorbent column. The salt may serve to convert metallic contaminants on the column to metal halo-complex ions (e.g. metal chloro-complex ions), or to maintain them as metal chloro-complex ions.

The aqueous alcohol may be acidic. It may comprise a reducing agent. The reducing agent may be present at about 0.01 to about 1% w/v, or about 0.05 to 1, 0.1 to 1, 0.5 to 1, 0.01 to 0.5, 0.01 to 0.1, 0.01 to 0.05, 0.1 to 0.5, 0.1 to 0.3 or 0.3 to 0.5%, e.g. about 0.01, 0.02, 0.03, 0.04, 0.05, 0.06, 0.07, 0.08, 0.09, 0.1, 0.2, 0.3, 0.4, 0.5, 0.6, 0.7, 0.8, 0.9 or 1%. In particular examples the reducing agent is ascorbic acid present at 0.1%-0.5% w/v or potassium iodide present at 0.1%-0.5% w/v. The reducing agent may serve to convert any contaminant $Fe^{3+}$ and/or $Cu^{2+}$ ions which may be present to $Fe^{2+}$ and/or $Cu^{1+}$ ions, respectively, which can be more easily be removed from the cation exchange resin. The reducing agent may therefore have a sufficiently high reduction potential to be capable of reducing $Fe^{3+}$ and/or $Cu^{2+}$ to $Fe^{2+}$ and/or $Cu^{1+}$, respectively. The pH of the aqueous alcohol may be less than about 2, or less than about 1.5 or 1, or may be about 0 to about 2, or about 0 to 1, 1 to 2, 1 to 1.5 or 1.5 to 2, e.g. about 0, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9 or 2. It may contain about 0.01M to about 0.5M (or about 0.01 to 0.2, 0.01 to 1, 0.01 to 0.05, 0.05 to 0.5, 0.1 to 0.5 or 0.1 to 0.3M, e.g. about 0.05, 0.06, 0.07, 0.08, 0.09, 0.1, 0.15, 0.2, 0.25, 0.3, 0.35, 0.4, 0.45 or 0.5M) HCl, or some other hydrohalic acid or other non-oxidising mineral acid, so as to keep the pH of the solution below about pH 2. Potassium, sodium or lithium ions (or combinations of these) present in the aqueous alcohol may serve as counter ions for stronger displacement of contaminant metallic ions from the cation exchange resin. The low pH may serve to facilitate the reduction reaction.

The volume of aqueous alcohol used for the elution will depend on the amount of cation exchange resin used. It may be about 2 to about 10 ml, or about 2 to 5, 5 to 10 or 3 to 8 ml, e.g. about 2, 3, 4, 5, 6, 7, 8, 9 or 10 ml. The aqueous alcohol eluent that exits elution column is directed to a waste container for later disposal. This eluent contains unwanted impurities.

Following elution of the cation exchange resin with the aqueous alcohol, it is common to wash the column with a wash liquid. The purpose of this is to remove excess aqueous alcohol from the resin, along with any impurities remaining in the residual aqueous alcohol on the resin. A suitable wash liquid is water, which has the benefit that it does not bring additional impurities into the resin. It may be pure water, e.g. distilled, deionised or otherwise purified water (e.g. MiliQ® water). The amount of wash liquid used may depend on the volume of the resin. It may typically be about 1 to about 5 ml, or about 1 to 3, 3 to 5 or 2 to 4 ml, e.g. about 1, 2, 3, 4 or 5 ml. The wash liquid (or, if the wash liquid is not used, the aqueous alcohol) may be at least partially removed from the resin by use of air or some other suitable gas. This may be high purity gas (e.g. high purity air). It may be particle free gas. It may be filtered e.g. through a 0.2 micron filter, prior to being passed into the resin. A suitable volume of air will depend on the volume of the resin, but a volume of about 0.5 to about 3 ml may be used, or about 0.5 to 2, 0.5 to 1, 1 to 3, 2 to 3, 0.8 to 1.5 or 1 to 2 ml, e.g. about 0.5, 0.75, 1, 1.25, 1.5, 1.75 2, 2.5 or 3 ml. In some cases somewhat more air may be used, e.g. about 3 to about 5 ml, or about 3 to 4, 4 to 5 or 3.5 to 4.5 ml, e.g. about 3, 3.5, 4, 4.5 or 5 ml. Once again, the wash liquid, if used, and any liquid purged from the resin by the gas is directed to the waste container.

Following the above washing sequence, the $^{68}$Ga remains essentially free of contaminants on the resin. It can then be eluted from the resin using a suitable eluent. Various eluents may be used to achieve this. A common eluent is an alkaline eluent, e.g. aqueous hydroxide. It may be for example aqueous sodium hydroxide, aqueous potassium hydroxide or a mixture of these. A suitable concentration of hydroxide in the eluent is about 0.2 to about 1M, or about 0.2 to 0.7, 0.2 to 0.5, 0.5 to 1 or 0.6 to 0.8, e.g. about 0.2, 0.3, 0.4, 0.5, 0.6, 0.7, 0.8, 0.9 or 1M. The elution may in this case be conducted for sufficient time to convert the gallium to gallate ion. The amount of eluent will depend on the volume of the resin used, but may typically be in the range of about 0.5 to 2 ml, or about 0.5 to 1.5, 0.5 to 1, 1 to 2 or 0.8 to 1.5 ml, e.g. about 0.5, 0.6, 0.7, 0.8, 0.9, 1, 1.1, 1.2, 1.3, 1.4, 1.5, 1.6, 1.7, 1.8, 1.9 or 2 ml. The amount of eluent should be sufficiently large so as to efficiently elute substantially all of the gallium from the resin, but sufficiently small as to not unnecessarily dilute the gallium product. The eluent from the eluent column is directed to a product container. Alternative eluents, as discussed above, include complexing agents for gallium. These include citrate, lactate, tartrate, EDTA etc. Preferred complexing agents are those that are clinically acceptable, as the purified gallium is commonly used in a clinical application. A suitable complexing agent therefore is citrate. For example about 0.75 mL-1.0 mL of a 25 mg/mL sodium citrate solution (about pH=5) may be use used. About 0.75 mL-1.0 mL acidic solution of 0.5 M HCl may also be used for $^{68}$Ga elution from the cation exchange resin column Following elution of the gallium from the elution column, it is preferable to return the column to a condition suitable for the next purification cycle. In the event that the eluent used to remove gallium from the resin, is not acidic, the resin may, following the elution, be in a non-acid form. The resin is therefore commonly treated with an acid in order to return the resin to its acid form, suitable for binding further gallium. This may be achieved by passing an acid, or a solution thereof, through the resin. Suitable acids include aqueous acids. They may be strong acids. They may be mineral acids. A particular example is a hydrohalic acid such as hydrochloric acid. The acid is preferably moderately concentrated, e.g. about 1 to about 5N, or about 1 to 3, 2 to 4 or 3 to 5N, e.g. about 1, 2, 3, 4 or 5N. A sufficient amount should be passed through to fully convert the resin to the acid form. A suitable amount will depend on the amount of resin and on the is concentration of the acid and on the exchange capacity of the resin, but a typical volume is about 1 to about 5 ml, or about 1 to 3, 2 to 5 or 2 to 5 ml, e.g. about 1, 2, 3, 4 or 5 ml. Following this, the resin should be washed with a wash liquid. This may be the same as the earlier wash liquid described above, or may be different. Sufficient should be used to remove substantially all of the acid from the resin. A suitable amount is about 2 to about 10 ml, or about 2 to 5, 5 to 10 or 3 to 8 ml, e.g. about 2, 3, 4, 5, 6, 7, 8, 9 or 10 ml. Both the acid and the wash liquid should be directed to the waste container.

The above steps may be conducted in a continuously aqueous environment, i.e. no solvents, eluents or other liquids that are not aqueous are used. Indeed the only organic solvents in the process are commonly the alcohols used to wash the resin prior to eluting the gallium product.

If $^{68}$Ga is eluted from the resin with an alkaline solution, the resulting alkaline eluate may be neutralised or acidified. It may be neutralised or acidified by addition of a neutralising or acidifying agent. The neutralising or acidifying agent may be an acid. It may be an organic acid or may be an inorganic acid. It may be for example hydrochloric acid or acetic acid, or a mixture of acids. The acidification may be to a pH of between about 2 and about 5, or about 2 and 3, 2 and 4, 4 and 5, e.g. about 2, 2.5, 3, 3.5, 4, 4.5, 5. It may be buffered to the desired pH range. The resulting $^{68}$Ga solution may comprise a salt other than a gallium salt, e.g. sodium chloride and/or sodium acetate. The salt other than a gallium salt may be a clinically acceptable salt.

The final product may represent a $^{68}$Ga elution efficiency of greater than about 50%, or greater than about 55, 60 or 65%, or about 50 to about 80%, or about 50 to 75, 50 to 70, 60 to 80, 70 to 80 or 65 to 75%. As discussed earlier, it may comprise no detectable $^{68}$Ge, as gauged by gamma-ray spectroscopy. Once the $^{68}$Ge is loaded onto the sorbent, $^{68}$Ga may be obtained from the system for at least about 1 year without renewing the $^{68}$Ge, or at least about 1.1, 1.2, 1.3, 1.4 or 1.5 years. $^{68}$Ga may be obtained from the system at least about 300 times, or at least about 350, 400, 450 or 500 times without renewing the $^{68}$Ge, or about 300 to about 600 times, or about 300 to 500, 300 to 400, 400 to 600 or 400 to 500 times, e.g. about 300, 350, 400, 450, 500, 550 or 600 times.

The $^{68}$Ga produced by the above method may be regarded as purified in the sense that it is not accompanied by significant amounts (optionally detectable amounts) of other radioisotopes or of toxic substances. It should be recognised that other cations, such as sodium and/or potassium, may be present, and non-toxic counterions (or counterions having acceptably low toxicity for clinical uses) may also be present.

The method described above may be automated. It may be conducted using a dedicated $^{68}$Ga generator. A suitable generator is described herein. It may be conducted as "pushbutton" operation, whereby an operator simply activates the generator using a single operation (e.g. pushing a single button) and, after a suitable time, a product is generated without further operator intervention.

The purified $^{68}$Ga produced by the method may be used to produce a radiopharmaceutical preparation comprising purified $^{68}$Ga ions. This may comprise for example combining the solution of $^{68}$Ga with suitable adjuvants or other additives so as to prepare the radiopharmaceutical. It may comprise sterilising the radiopharmaceutical.

Thus in an embodiment the present invention relates to a method of purification and concentration of acidic $^{68}$Ga solution eluted from a $^{68}$Ge/$^{68}$Ga radionuclide generator using an acidic salt solution combined with a polymeric cationic ion exchanger column to achieve either an alkaline, acidic or complexing agent contained in the $^{68}$Ga solution used for formulating radiopharmaceuticals. An acidic $^{68}$Ga eluate eluted from a $^{68}$Ge/$^{68}$Ga radionuclide generator is passed through a polymer type strong cationic ion exchanger resin column. The $^{68}$Ga ions and other metallic ion impurities are retained on this resin column. In the following step, metallic ion impurities are removed by washing the column with a mixture of methanol and an acidic aqueous solution of potassium chloride, sodium chloride or lithium chloride (or of a mixture of these) and ascorbic acid. Then the $^{68}$Ga ions are eluted from the resin column solution by a small volume of either higher concentration hydrochloric acid solution, by alkaline solutions, or by a complexing agent containing solution. An alkaline concentrated $^{68}$Ga collected may be neutralized with glacial acetic acid or with any mineral acid solution. An acidic concentrated $^{68}$Ga collected may be neutralized with any suitable alkaline solution. Either neutralized or complexing agent containing $^{68}$Ga solutions obtained in this fashion may be used for formulating radiopharmaceuticals.

The apparatus described herein for purifying $^{68}$Ga from a solution comprising $^{68}$Ge ions and $^{68}$Ga ions is commonly a portable device. It may be transportable. It may comprise a housing in which the components described earlier are housed. It may be a metal housing. It may be an openable housing. The controller may be a portable controller. It may be a detachable controller. It may be coupled to the valves, pumps etc. of the apparatus, or couplable thereto, by means of an electric cable. The cable may be coupled to, or couplable to, the valves, pumps etc. The controller may be programmable. It may be portable. The apparatus may be provided with the sorption column or may be is provided without the sorption column. When provided with the $^{68}$Ge sorption column, it may weigh less than about 30 kg, or less than about 25, 20, 15 or 10 kg. It may for example weight about 5, 10, 15, 20, 25 or 30 kg. It may comprise a metal housing. The radiation shielding lead pot housing the $^{68}$Ge sorption column described earlier may be housed in said metal housing. The sorption column may be coupled to, or couplable to, the remainer of the apparatus. The coupling may be a watertight coupling which allows an eluate to pass from the sorption column to valve V3 (see FIG. 2, for example) without leakage of eluate. The coupling may comprise a tubing port connection. It may be rapid coupling. The sorption column may be disposed inside a housing. The housing may be a radiation proof housing. It may comprise radiation shielding, e.g. lead shielding, so as to prevent (or reduce to an acceptable level) escape of radiation from the sorption column. The entire apparatus may comprise radiation shielding, e.g. lead shielding, so as to prevent (or reduce to an acceptable level) escape of radiation. This shielding may surround the entire apparatus, or it may surround one or more individual components (valves, pumps, tubings etc.) of the apparatus. Containers in the apparatus that are intended to contain radioactive materials (e.g. any one of waste container W, container G and product container F) may have radiation shielding. They may comprise lead glass. They may be surrounded by radiation shielding.

A suitable sorbent column for separating $^{68}$Ga from $^{68}$Ge so as to produce the crude $^{68}$Ga solution may comprise:
a housing comprising a body, an inlet and an outlet;
a valve coupled to the outlet for controlling flow of a liquid from the column;
a sorbent disposed in the body of the housing, said sorbent having a higher affinity for the $^{68}$Ge than for $^{68}$Ga; and
a liquid permeable restrictor disposed between the sorbent and the valve for preventing exit of the sorbent from the body of the housing.

The restrictor may be for example a frit. It may be a sintered glass frit, a metal free plastic frit or some other type of frit. There may be a second liquid permeable restrictor at or near the inlet of the housing. The housing, the valve and the restrictor(s) may all be constructed from materials that are not rapidly degraded by radioactivity from the $^{68}$Ge and $^{68}$Ga. The materials may also not be degraded by acidic solutions, in particular by acidic solutions used in operation of the separation column. Suitable materials include for example metal-free plastic or quartz. The separation column may comprise a radiation shield. The shield may at least partially surround the housing and/or the valve.

This invention also relates to an automated system to perform the purification, and purification methods described above. The operation of this apparatus may be programmable to suit any radiochemical purification and purification process of features such as that described above. In preferred embodiments, all components of the apparatus are operated under the control of a central timing system to perform different processes based on sequentially coordinated operations.

Figure 17:
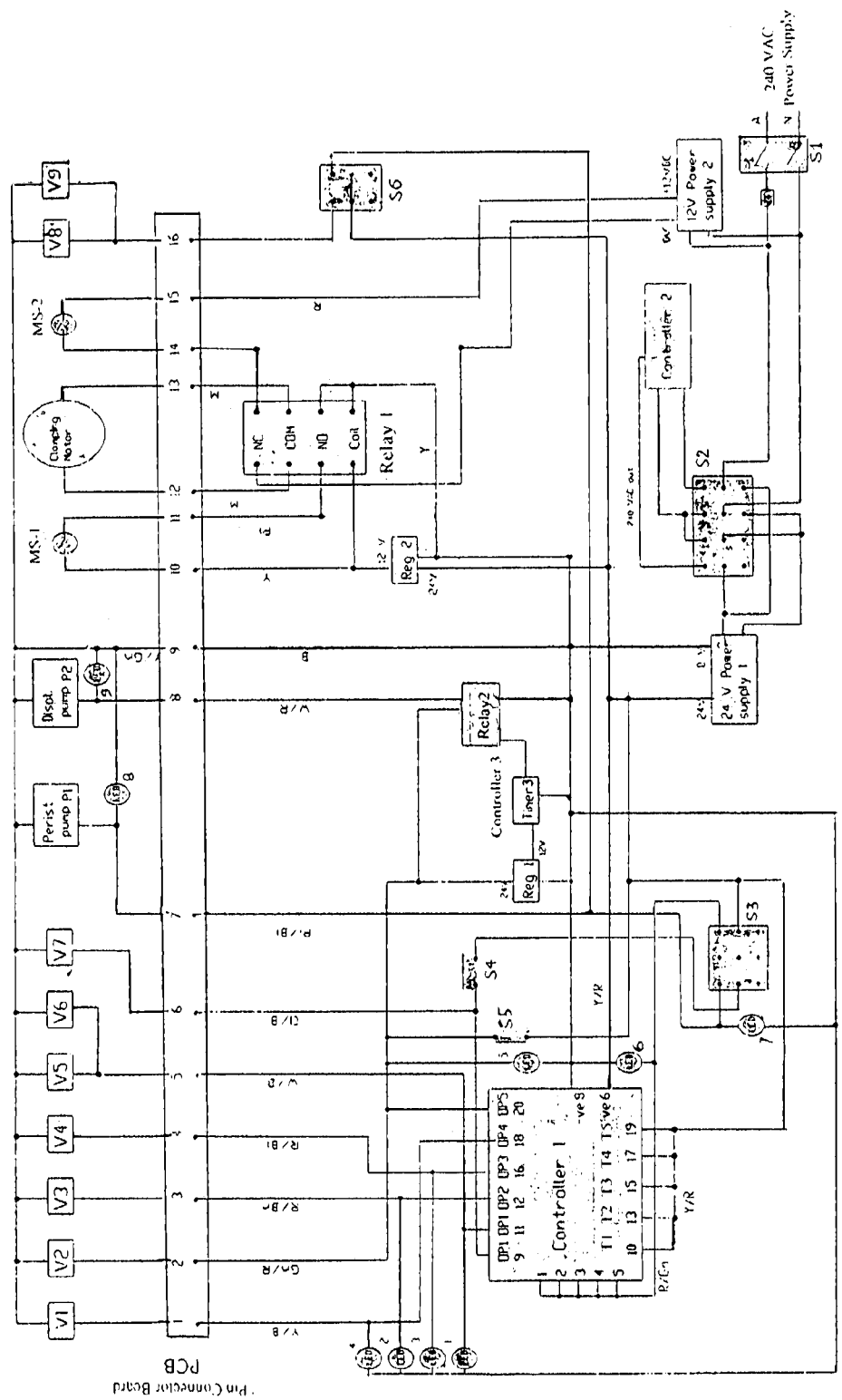
FIG. 17: An electrical diagram of the apparatus controller of the $^{68}$Ga eluate purification system.

A suitable apparatus controller for use in the apparatus of the present invention is described with reference to FIG. 17. This control unit has the following components:
programmable relay timer based controllers Controller 1 and Controller 2,
variable frequency timer Timer 3 or Controller 3,
multi-switch relay Relay1 and single switch relay Relay2,
24V-12V voltage regulators Reg 1 and Reg 2,
24 V Power Supply 1 and 12 V Power Supply 2,
power switches S1, S2, S3, S4, S5, S6 and micro-switches MS-1 and MS-2,
LED indicators LED1, LED2, LED3, LED4, LED5, LED6, LED7, LED8 and LED9,
16 Pin Connector Board PCB.

i. Controller 1

This controller is constructed from five independent programmable relay timers with different time setting and operation functioning. The main function of each timer of Controller 1 is to activate and/or deactivate several valves and/or pumps through the ON or OFF status of the relay switches, respectively, following a preset program as described in Table 1 of this specification. With the ON or OFF position of relay switch outputs of each timer, the power supply is connected to, or disconnected from, the respective valves or pumps, respectively. So the valves and pumps are activated or deactivated according to an optimized time sequence-based timing program as described in Table 1. The functions of each timer of Controller 1 are as follows:

T1 (power input 10) with relay switch outputs, the OP1/9 for functioning the On-Off-On-Off time-recycling operation of peristaltic pump 1 and Valve 7 and the OP1/11 for functioning the On-Off-On-Off time-recycling operation of Valve 5 and Valve 6.

T2 (power input 13) with a relay switch output OP2/12 for functioning the delay-on timing operation of Valve 3.

T3 (power input 15) with a relay switch output OP3/16 for functioning the On-Off-On-Off time-recycling operation of Valve 4.

T4 (power input 17) with a relay switch output OP4/18 for functioning the delay-on timing operation of Valve 1.

T5 (power input 19) with a relay switch output OP5/20 for functioning the On-Off-On-Off time-recycling operation of Valve 2 and displacement pump P2.

ii. 24 V Power Supply 1, Start/Reset Switch S3 and Safety Switch S4

24 V Power supply 1 is a 240 VAC/24 VDC adaptor. This unit supplies the power to Controller 1, Valves 1-7 and pumps P1 and P2 via switch S3. When the Start/Reset switch S3 is in the Start position then Controller 1 is activated to control the operation of Valves 1-7 and pumps P1 and P2. Otherwise, when the Start/Reset switch S3 is in the Reset position, Controller 1 is deactivated and returns to the starting time of the preset program.

Switch S4 is designed for safe operation and is provided to stop any liquid or air flow in the tubing network of the processing system during programming and maintenance work. When switch S4 is in the Off position, then, except for pump P1, all other units are capable of operation without any liquid or air flow in the tubing network of the processing system.

iii. Controller 2, Main Power Switch S1 and Auto/Manual Scheduling Switch S2

Controller 2 is a multi-program relay timer which connects 24 V Power supply 1 to a 240V main power supply via an Auto/Manual scheduling switch S2. Controller 2 is activated when switch S2 is in the Auto position, which allows the whole process of $^{68}$Ga elution/purification to be turned on automatically according to a preset time schedule based on a working hour-and-day basis.

Controller 2 is deactivated when switch S2 is in the Manual position, which allows the whole process of $^{68}$Ga elution/purification to be turned on manually at any time when needed.

S1 is a main power switch to connect a 240 VAC power supply to the control unit of the $^{68}$Ga generator/purification system.

iv. Controller 3, Voltage Regulator Reg 1 and Relay 2

Frequency timer 3 or Controller 3 is used for operating a micro-volume replacement pump for alkali/acidic/complexing agent eluent delivery to remove Ga-68 from the cationic ion exchange column. Controller 3 is an electrical frequency-generating circuit capable of generating an electrical output of adjustable on/off time frequency. This electrical on/off frequency output will activate/deactivate Relay 2 to switch on or off respectively, a solenoid coil of pump 2. In this way the flow rate delivered by pump 2 is controlled by an adjustable electrical frequency from Controller 3. The variable frequency is tuned by a potentio-resistance located on timer 3.

Controller 3 is activated/deactivated by Controller 1 via a voltage regulator Reg 2.

Controller 3 and pump P2 are also activated/deactivated by a direct power supply from 24 V Power supply 1 via switch S5. This design facilitates the optimization of the liquid follow rate of eluent passing through the ion exchange resin column as described elsewhere in this specification. For this purpose, switch S5 is switched and switch S3 is put in the Reset position. At this time the tuning of potentio-resistance located on timer 3 enables the adjustment of liquid flow rate delivered by pump P2.

v. Relay 1, Voltage Regulator Reg 2 and 12 V Power Supply 2

Relay 1 is activated and deactivated by Controller 1 via Reg 2 and by 12 V Power Supply 2. This relay is used for interchanging the electrical pole applied to a clamping motor. The action of this electrical pole changing makes the motor rotation changeable in the forward or reverse directions. With the help of micro-switches MS-1 and MS-2, the clamping motor is stopped at defined positions in both forward or reverse directions. In the forward direction, moving of the clamping motor activated by 24 V Power supply 1 at the start of elution/purification process causes the plastic delivery tube of peristaltic pump P2 to be squeezed so as to enable liquid flow delivery. In the reverse direction moving the clamping motor activated by 12 V Power Supply 2 at the end of elution/purification process causes the tube to be released (with a electrical pole changing with action of Relay 1 caused by a power cut from Controller 2 and Reg 2).

This design is intended to increase the life-time of the plastic delivery tube of peristaltic pump P1 corresponding to a long life-time of $^{68}$Ge/$^{68}$Ga generator/Ga-68 purification system.

vi. Switch S6

Figure 10:
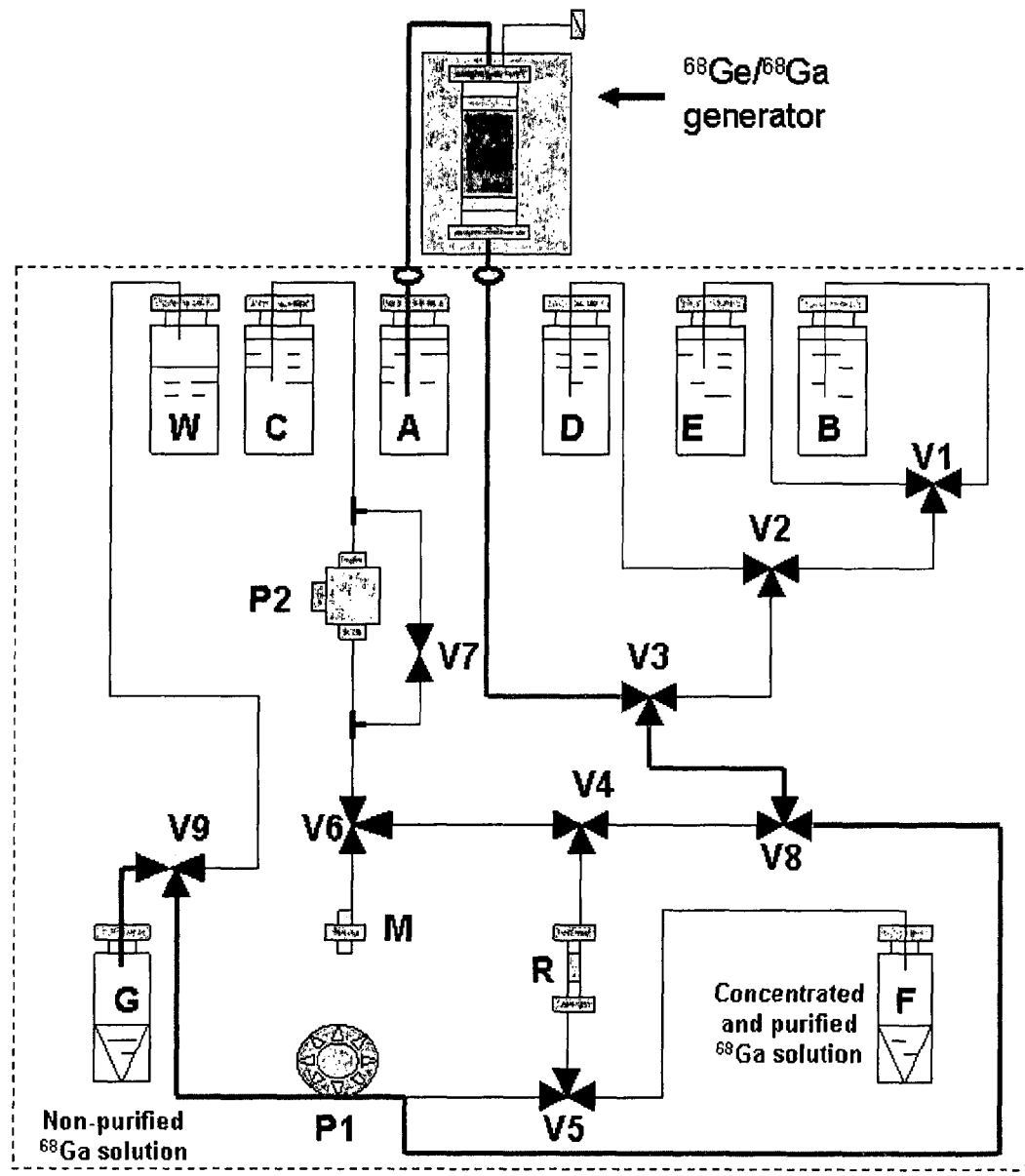
FIG. 10: Illustrates optional operation of the $^{68}$Ga eluate purification system (Thicker solid lines denote the liquid flow path starting from reservoir A).

With switch S2 in the Manual position and S3 on Reset, switch S6 is used to switch on pump P1, and valves V8 and V9 for direct elution of $^{68}$Ga from the sorbent column of the $^{68}$Ge/$^{68}$Ga generator as illustrated in FIG. 10 and elsewhere in this specification.

vii. LED Indicators LED1, LED2, LED3, LED4, LED5, LED6, LED7, LED8 and LED9

Generally, a lighted LED indicator indicates the operation of the relevant component:

Indicator LED1, when lit, indicates that valves V5 and V6 are in operation;

Indicator LED2, when lit, indicates that valve V3 is in operation;

Indicator LED3, when lit, indicates that valve V4 is in operation;

Indicator LED4, when lit, indicates that valve V1 is in operation;

Indicator LED5, when lit, indicates that valve V2 and pump P2 are in operation;

Indicator LED6, when lit, indicates that the control unit is in operation and the $^{68}$Ga generator/purification system is working;

Indicator LED7, when lit, indicates that pump P1 and V7 are in operation;

Indicator LED8, when lit, indicates that pump P1 and V7 are in operation;

Indicator LED9, when lit, indicates that pump P2 is in operation.

viii. Pin Connector Board PCB

This component is used as a communication connecting between the control unit, the valves, pumps, motor and LED indicators that are located on the working station in the $^{68}$Ga generator/purification system.

Advantages of the method and apparatus of the invention include:

newly developed and mild aqueous solution based purification-concentration process provides effective and safe operation;

bench-top integrated systems with programmable production and automatic operation makes the method friendly to moderately skilled operators;

multi-automatic elution performance with low radiation dose exposure and reliable long-time operation;

high quality product, cost-effectiveness and safe utilisation;

high demand profitable production feasibility;

due to the long life of the $^{68}$Ge parent, the $^{68}$Ga generator may be used in laboratories which have difficulty in high current (>100 µA and moderate proton energy about 30 MeV) cyclotron access for $^{68}$Ge production.

$^{68}$Ga finds significant applications in the following (conventional and new specific radiopharmaceuticals):

$^{68}$Ga Conventional Radiopharmaceuticals and Applications

| Radiopharmaceuticals | Applications |
|---|---|
| $^{68}$Ga-transferrin; $^{68}$Ga-DTPA-albumin | Plasma protein volume |
| $^{68}$Ga-albumin microspheres | Pulmonary |
| $^{68}$Ga-Macroaggregated albumin | Myocardial and cerebral |
| $^{68}$Ga—Fe(OH)$_3$ colloid; $^{68}$Ga-alizarin | Liver/spleen RES function |
| $^{68}$Ga[(5-MeOsal)$_3$tame; $^{68}$Ga-BAT-TECH | Myocardial blood flow |
| $^{68}$Ga-EDTA | Detection of blood-brain |
| $^{68}$Ga-PLED; $^{68}$Ga-EDTA; $^{68}$Ga-PolyMetaphosphate | Renal function |
| $^{68}$Ga-t-butyl-HBED; $^{68}$Ga-BP-IDA; $^{68}$Ga-(3,4DiP-LICAM); $^{68}$Ga—Br-EHPG; $^{68}$Ga—Br-HGED | Hepatobiliary function |
| $^{68}$Ga-DTPA-antimyosin | Detection of myocardial |
| $^{68}$Ga-DTPA-low density lipoprotein | Lipoprotein metabolism |
| $^{68}$Ga-galactosyl-neoglycoalbumin | Hepatocyte function |
| $^{68}$Ga-EDTMP | Bone scanning (metastatic |
| $^{68}$Ga-red blood cells; $^{68}$Ga-platelets | Thrombosis localisation |

New Specific Radiopharmaceuticals and Applications

Targeting $^{68}$Ga Radiopharmaceuticals in Clinical Trials

| Radiopharmaceuticals | Application |
|---|---|
| $^{68}$Ga-DOTA-TOC | Targeting several subtypes of somatostatin receptors for the imaging neuroendocrin tumours |
| $^{68}$Ga-DOTA-NOC | |
| $^{68}$Ga-DOTA-TATE | |
| $^{68}$Ga-DOTA-Lanreotide | |
| $^{68}$Ga-DOTA-Bombesin | Imaging gastro-intestinal stromal, colon and prostate |
| 68Ga-AMBA | Being studied in NMB and GRP-R bombesin receptors |
| [68Ga-DOTA-D-Glu]ygastrin | Being studied in medullary thyroid cancer |

EXAMPLE 1

FIG. 1 shows a flow chart of a representative method for obtaining purified $^{68}$Ga. In FIG. 1, the upper of the two columns shown is a sorbent column for $^{68}$Ge adsorption, and contains about 1 g of sorbent. The lower of the two columns shown contains a cation exchange resin. A suitable resin is AG-50W-x4, particle size <200-400 mesh, pKa≤0, capacity 1.1 meq/ml. About 30 mg of resin is present in the column. Another suitable resin is Oasis MCX®, particle size 35 micron, pKa<1, capacity 1 meq/g, with about 60 mg of resin in the column. The left hand container connected to the outlet from the lower column is a product container. The product which passes into this container comprises an aqueous solution of $^{68}GaCl_3$ in about 0.5 M sodium chloride or sodium acetate at about pH 3-4. The right hand container connected to the outlet from the lower column is a waste container, which in use may contain one or more of iron, copper, zinc, germanium etc.

In the method illustrated in FIG. 1, the following conditions were used:

OP1: addition of 7 ml of solution A (a 0.1M aqueous hydrochloric acid) to the sorbent column;
OP2: addition of 3 ml of solution B (an acidic aqueous solution of potassium chloride, sodium chloride or lithium chloride with added methanol and ascorbic acid) to the cation exchange resin;
The following are four options for solution B which have been used in practice:
Option 1: aqueous solution containing 0.5 M HCl+0.05M KCl+0.5% Ascorbic acid+30% Methanol
Option 2: aqueous solution containing 0.05 M HCl+0.25M KCl+0.5% Ascorbic acid+30% Methanol
Option 3: aqueous solution containing 0.5 M HCl+0.1M NaCl+0.5% Ascorbic acid+30% Methanol
Option 4: aqueous solution containing 0.5 M HCl+0.1.5M LiCl+0.5% Ascorbic acid+30% Methanol)
OP3: addition of 3 ml of liquid E (water) to the cation exchange resin;
OP4: passing 5 ml air through the cation exchange resin;
OP5: adding 0.75 ml of solution C (0.5M aqueous NaOH and/or KOH) to the cation exchange resin;
OP6: addition of 3 ml of solution D (4M aqueous hydrochloric acid) to the cation exchange resin;
OP7: addition of 5 ml of liquid E to the cation exchange resin.

In operation of the method, $^{68}Ge$ is adsorbed onto the sorbent in the upper column. This decays over time to $^{68}Ga$, which initially remains on the upper column. When the $^{68}Ga$ is required, it is eluted in the form of $^{68}GaCl_3$ from the upper column in step OP1, and the eluent is passed through the lower column, where the $^{68}Ga$ adsorbs onto the cation exchange resin. The liquid eluent passes into the waste container. In OP2, unwanted contaminant ions (iron, germanium etc.) are washed from the resin and deposited in the waste container. In OP3, the resin is washed with water, so as to remove residual solution B from the column. This eluent is again passed to the waste container. In OP4, air is passed through the resin. This removes much (although not all) of the water on the resin column, so as not to unduly dilute the $^{68}Ga$ product. The water propelled from the resin by the air is also directed to the waste container. In step OP5 solution C is used to elute the $^{68}Ga$ from the resin. In this example solution C is alkaline, so the $^{68}Ga$ is converted to gallate ion. The resulting aqueous gallate solution is directed to the product container, or is to an intermediate neutralisation container (not shown in FIG. 1). It is then neutralised to about pH 3-4 using either acetic acid or hydrochloric acid so as to generate the product in the form of a solution of $^{68}GaCl_3$ in aqueous sodium chloride or sodium acetate (about 0.5 M). Following elution of this product, the resin is washed with solution D so as to return it to its acid form. The eluted acid is passed to the waste container. Finally the resin is washed with liquid E so as to remove excess acid from the resin, the eluent being again passed to the waste container.

Figure 2:
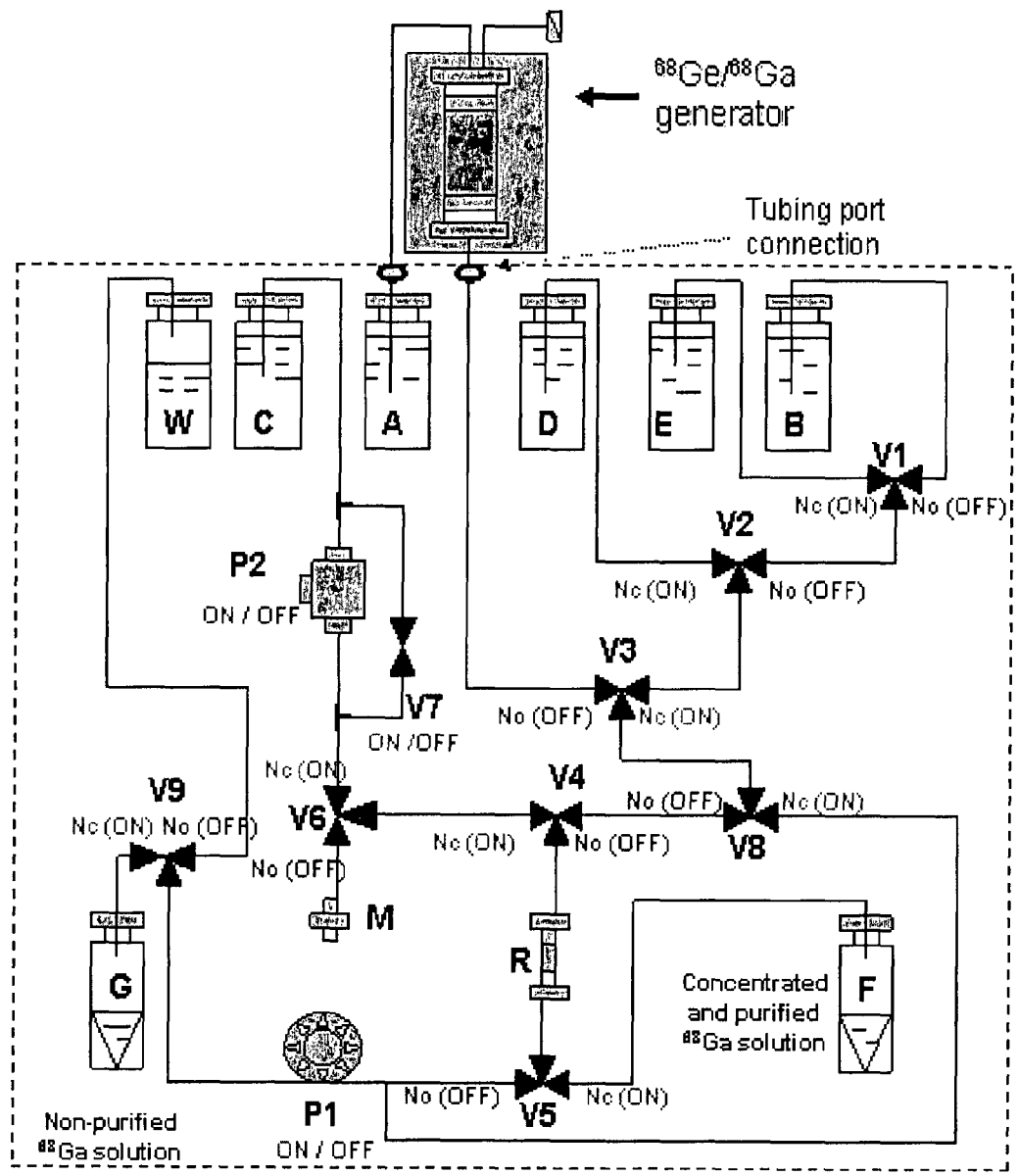
FIG. 2: A diagram illustrating the arrangement and connection of the components of $^{68}$Ga purification apparatus of the present invention.

FIG. 2 illustrates an apparatus for conducting the method described above. In FIG. 2, the shaded box at the top represents a sorbent column which has been loaded with $^{68}Ge$ from a cyclotron-produced carrier-free $^{68}Ge$ stock solution reservoir, and contains adsorbed $^{68}Ga$ from decay of the $^{68}Ge$. The inlet of the sorbent column, containing about 1 g of sorbent, is coupled to container A (described below) and the outlet of the sorbent column is coupled to valve V3 (described below). These couplings are by means of tubing port connections. Column R is a resin column, which contains about 60 mg of a porous polymeric cation exchange resin.

The apparatus of FIG. 2 comprises various liquid containers. These include containers A, B, C, D and E in which solutions/liquids A, B, C, D and E respectively (described above in the method description) are located. The containers typically each have a volume of from about 30 mL to about 150 mL (although in some cases volumes outside this range may be used). This volume is typically enough for a one day utilisation. The refill solutions may be supplied along with the generator system. Container W is a waste container for receiving and storing wastes that are eluted from the resin column. Container F is a product container for receiving and storing the product $^{68}Ga$ solution from column R. The apparatus may optionally comprise a container G for receiving and storing unpurified $^{68}Ga$ solution, which may be eluted directly from the sorbent column without passing through resin column R. Pumps P1 and P2 are provided for pumping various liquids through the apparatus. Pump P1 is preferably a peristaltic pump, which provides a relatively pulse free flow with acceptably low pressure build-up. Inlet filter M is provided in order to filter air taken into the apparatus in step OP4 described above. Filter M is a microporous particle filter, commonly about 0.45, 0.2 or 0.1 micron pore size. It may be for example a hydrophobic Millipore® filter. Finally, valves V1 to V8, and (if container G is present) V9 are provided to control the flow through the apparatus. In preferred embodiments, these are all connected to, and controllable by, a controller (not shown in FIG. 2). Each of the valves has an "off" position and an "on" position. These valves are as follows:

V1—a 3-way valve coupled to containers B and E and to valve V2, so, as to direct either solution B (in the "off" position) or liquid E (in the "on" position") to valve V2;
V2—a 3-way valve coupled to container D and valves V1 and V3, so as to direct either solution D (in the "on" position") or the liquid/solution from valve V1 (in the "off" position) to valve V3;
V3—a 3-way valve coupled to the outlet of the sorbent column and to valves V2 and V8, so as to direct either an eluent from the sorbent column (in the "off" position) or a liquid/solution from valve V2 (in the "on" position") to valve V8;
V4—a 3-way valve coupled to valves V6 and V8 and to the inlet to resin column R, so as to control the liquid/gas/solution that is directed to the inlet to resin column R. In the "off" position, liquid passes from V8 to the inlet and in the "on" position from V6 to the inlet;
V5—a 3-way valve coupled to the outlet from resin column R, to product container F and, via pump P1 to waste container W, enabling eluent from resin column R to be directed as required either to waste container W (in the "off" position) or to product container F (in the "on" position"). Valve V5 also prevents unpurified eluent from the sorbent column, which can pass from the sorbent column through valves V3 and V8 by-passing resin column R, from entering the outlet of resin column R;

V6—a 3-way valve coupled to container C via pump P2, to valve V4 and to inlet filter M, so that either air, taken into the apparatus through filter M (in the "off" position) or solution C (in the "on" position") can be directed to valve V4;

V7—a flow control valve which, when open (i.e. in the "on" position), allows solution C to be circulated through pump P2;

V8—a 3-way valve coupled to valves V3 and V4, and to the line from valve V5 to waste container W. Valve V8 allows unpurified eluent from the sorbent column to by-pass resin column R (in the "on" position). This would generally only be used in cases where valve V9 and container G are present, so that the unpurified eluent (containing $^{68}$Ga and some ion impurities) can be directed through valve V9 to container G. In the "off" position V8 allows liquid/solution from V3 to pass to V4;

V9—a flow control valve which is in normal operation closed (i.e. in the "off" position), however is open (i.e. in the "on" position) when un-purified eluent from the sorbent column by-passes the resin column R.

FIGS. 3 to 10 illustrate the various stages in operation of the apparatus of FIG. 2. In FIGS. 3 to 10, the heavy lines illustrate the fluid flow at each stage.

Figure 3:
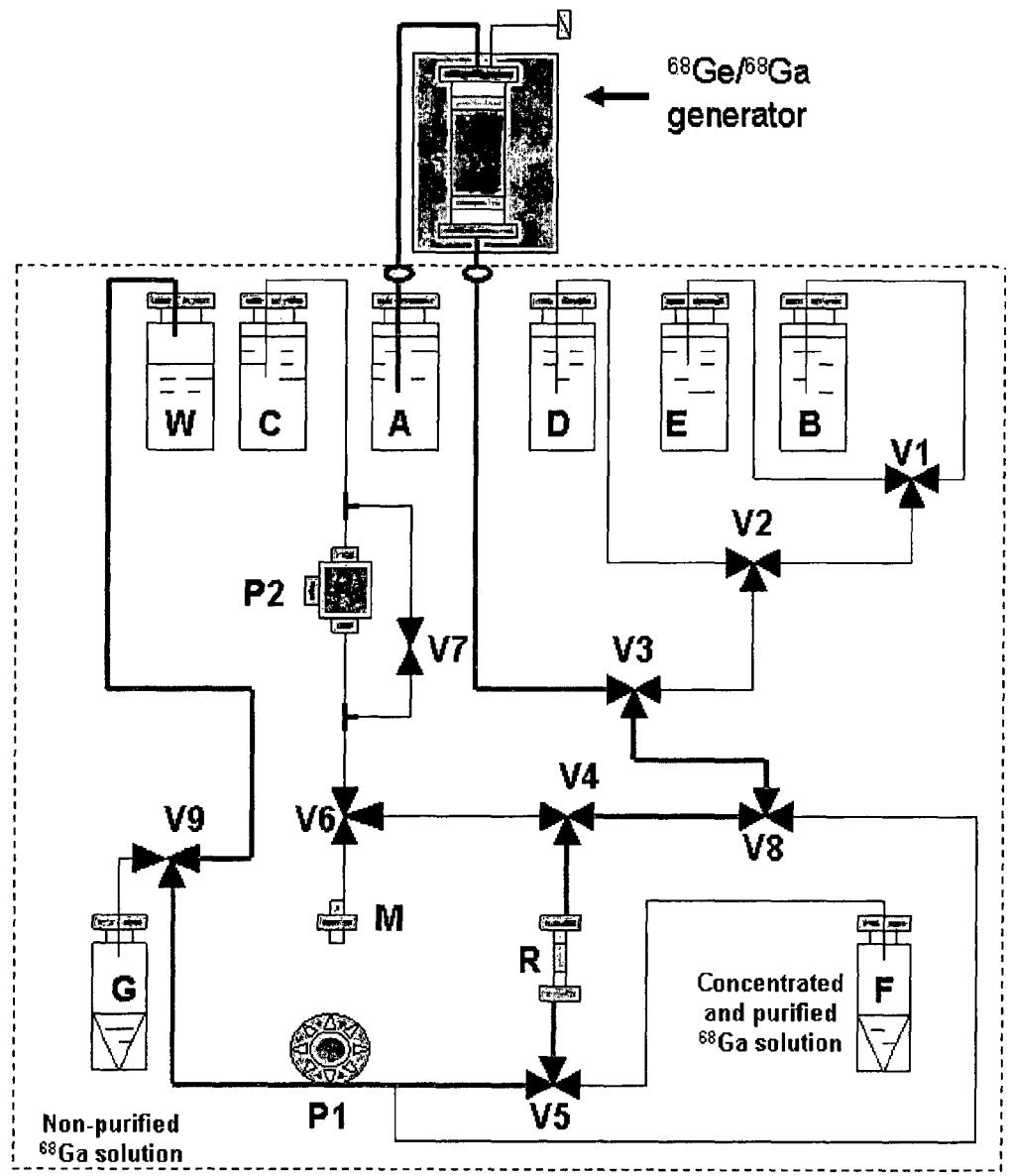
FIG. 3: Illustrates step 1 in the $^{68}$Ga purification method (thicker solid lines denote the liquid flow path starting from reservoir A).

FIG. 3 illustrates step 1 (OP1 above) in the $^{68}$Ga eluate purification and concentration. In this step $^{68}$Ga eluate in 0.1 M HCl solution is eluted from $^{68}$Ga generator under the effect of a peristaltic pump P1 and passes through cationic exchanger resin column R where $^{68}$Ga and different impure metal ions are retained. In this step, valve V3 is off, valve V4 is off, valve V5 is off, valve V8 is off and V9 is off. Thus solution A flow starts from container A. $^{68}$Ga eluate in 0.1 M HCl solution eluted from the sorbent column under the effect of peristaltic pump P1 passes via valves V3, V8 and V4 through cation exchanger resin column R where $^{68}$Ga and different metal ion impurities are retained. The remaining solution passes out of column R via valve V5 (in its "off" position) to waste container W.

Figure 4:
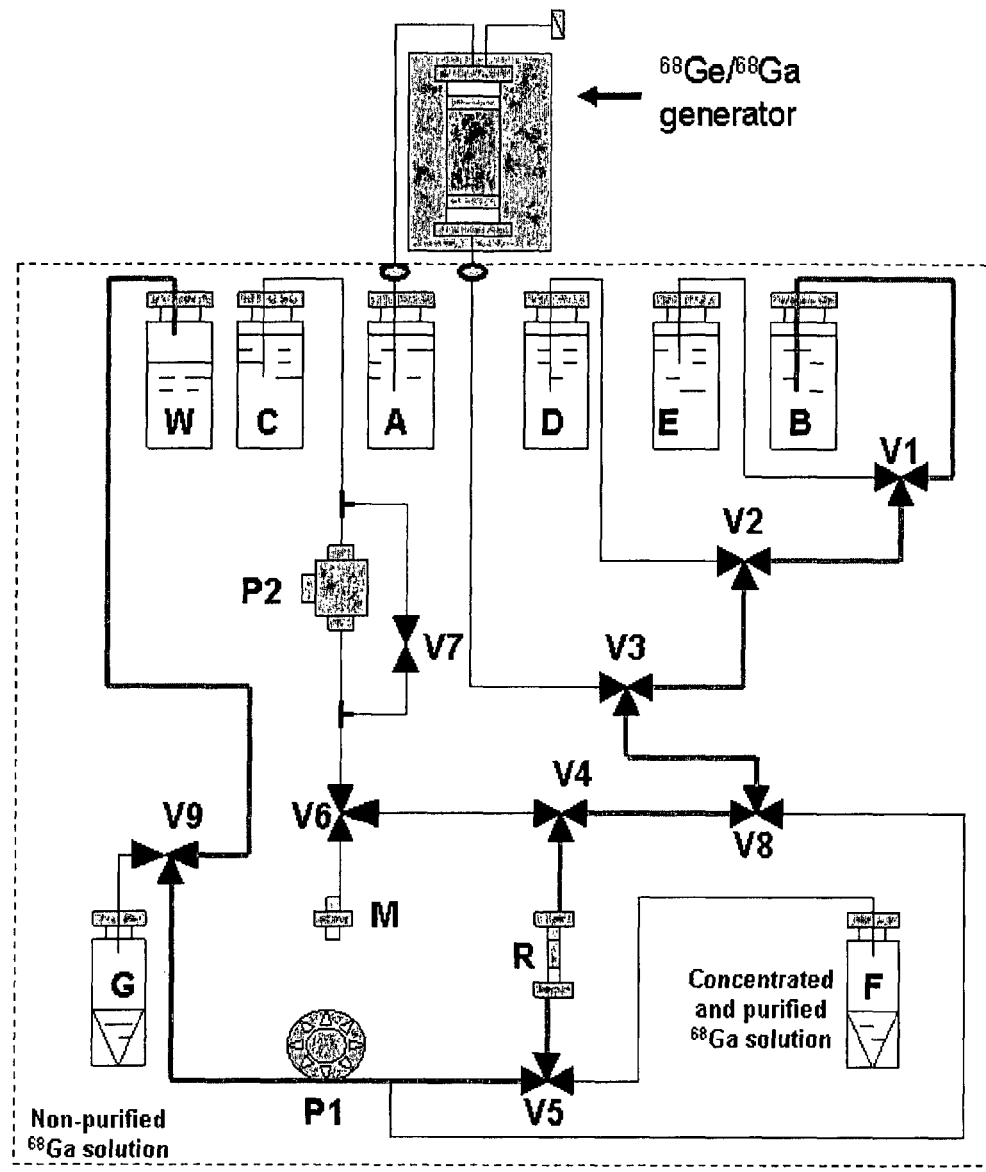
FIG. 4: Illustrates step 2 in the $^{68}$Ga eluate purification method (thicker solid lines denote the liquid flow path starting from reservoir B).

FIG. 4 illustrates step 2 (OP2) in the $^{68}$Ga eluate purification and concentration. In this step a mixture of methanol, acidic aqueous potassium chloride, sodium chloride and/or lithium chloride and ascorbic acid passes under the effect of a peristaltic pump P1 through cationic exchanger resin column R to remove different impure metal ions into waste. In this step V1 is off, V2 is off, V3 is on, V8 is off, V9 is off, V4 is off and V5 is off. Thus flow of solution B (a mixture of methanol and an acidic aqueous solution of potassium chloride and ascorbic acid) starts from container B. Under the effect of peristaltic pump P1 it passes via valves V1, V2, V3, V8 and V4 through cation exchanger resin column R. It then passes through valve V5 to waste container W to remove various metal ion impurities from column R.

Figure 5:
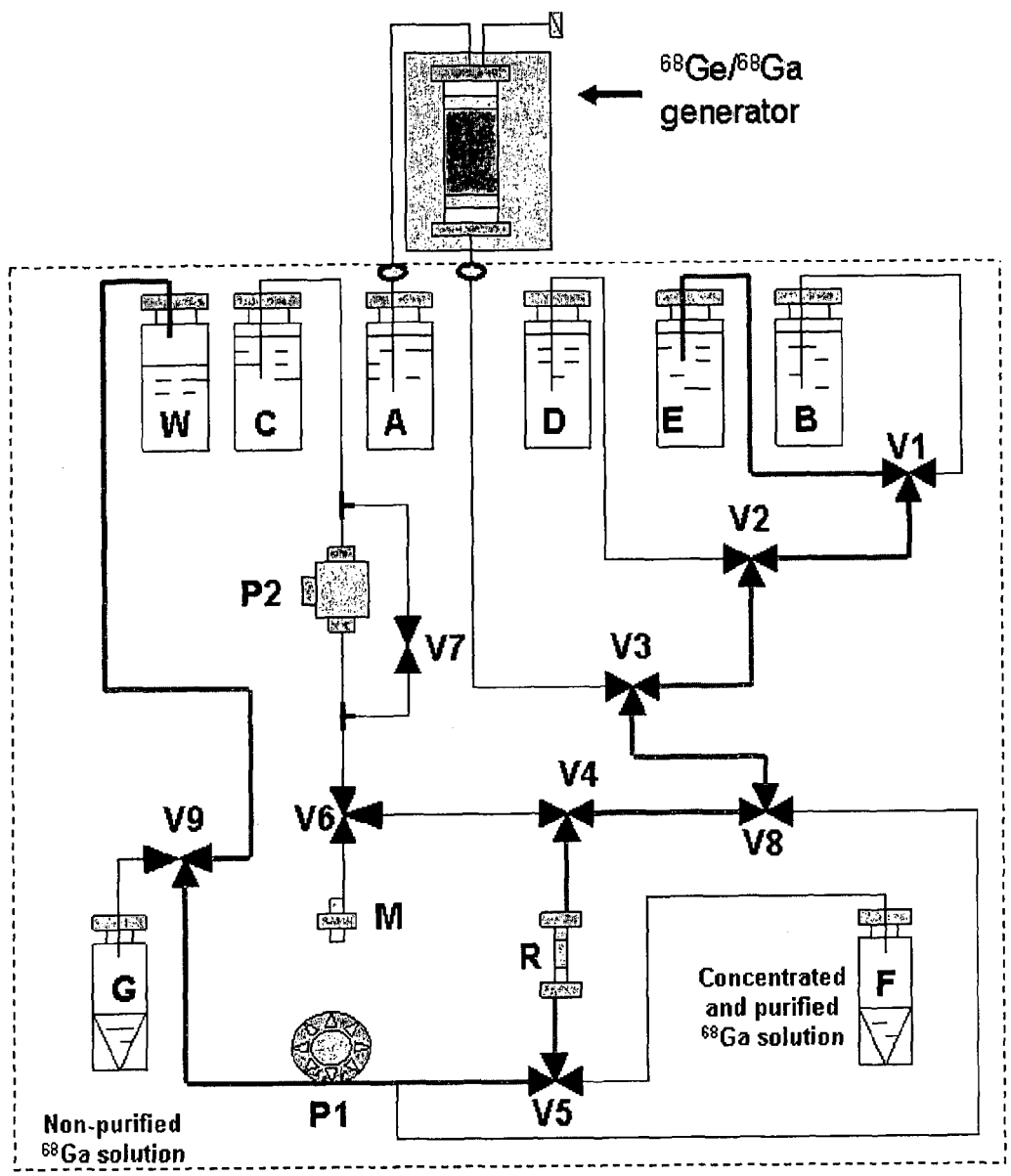
FIG. 5: Illustrates step 3 in the $^{68}$Ga eluate purification method (thicker solid lines denote the liquid flow path starting from reservoir E).

FIG. 5 illustrates step 3 (OP3) in the $^{68}$Ga eluate purification and concentration. In this step distilled water passes under the effect of a peristaltic pump P1 through a cationic exchanger resin column to remove the mixture of methanol, potassium chloride, sodium chloride and/or lithium chloride and ascorbic acid into waste. In this step V1 is on, V2 is off, V3 is on, V8 is off, V9 is off, V4 is off and V5 is off. Thus flow of distilled water starts from container E. Under the effect of peristaltic pump P1 the water passes via valves V1, V2, V3, V8 and V4 through cation exchanger resin column R. It then passes out of column R via valve V5 to waste container W, so as to remove residual methanol and potassium chloride from column R.

Figure 6:
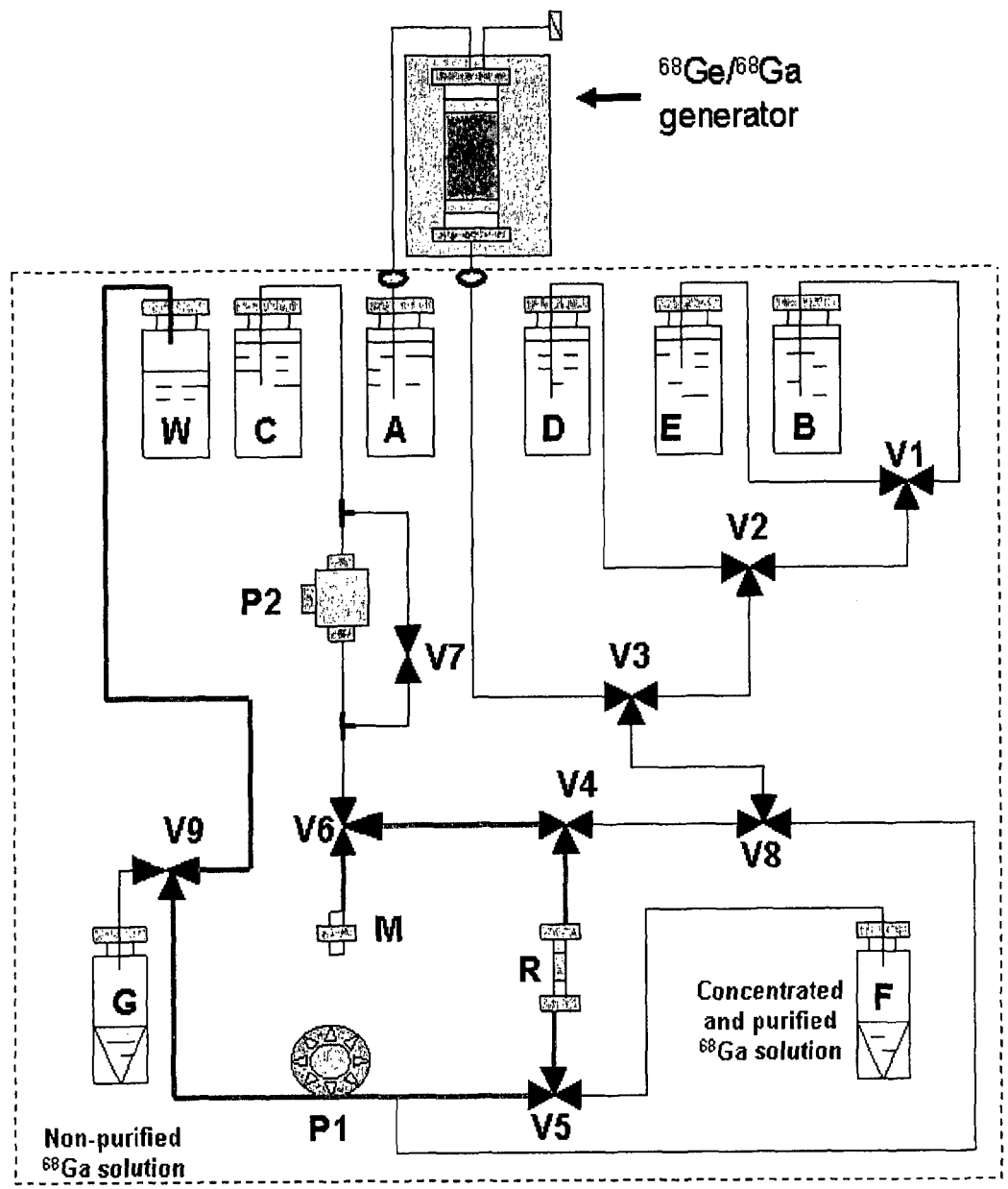
FIG. 6: Illustrates step 4 in the $^{68}$Ga eluate purification (thicker solid lines denote the gas flow path starting from the Millipore® filter M).

FIG. 6 illustrates step 4 (OP4) in the $^{68}$Ga eluate purification and concentration. In this step air flows under the effect of peristaltic pump P1 through cationic exchanger resin column R to remove distilled water into waste. In this step, V6 is off, V4 is on, V5 is off and V9 is off. Thus air flow starts from the filter M under the effect of a peristaltic pump P1. The air passes through filter M, via valves V6 and V4, through cation exchanger resin column R. The air, and liquid forced by the air from column R, pass through valve V5 to waste container W so as to remove residual distilled water from column R.

Figure 7:
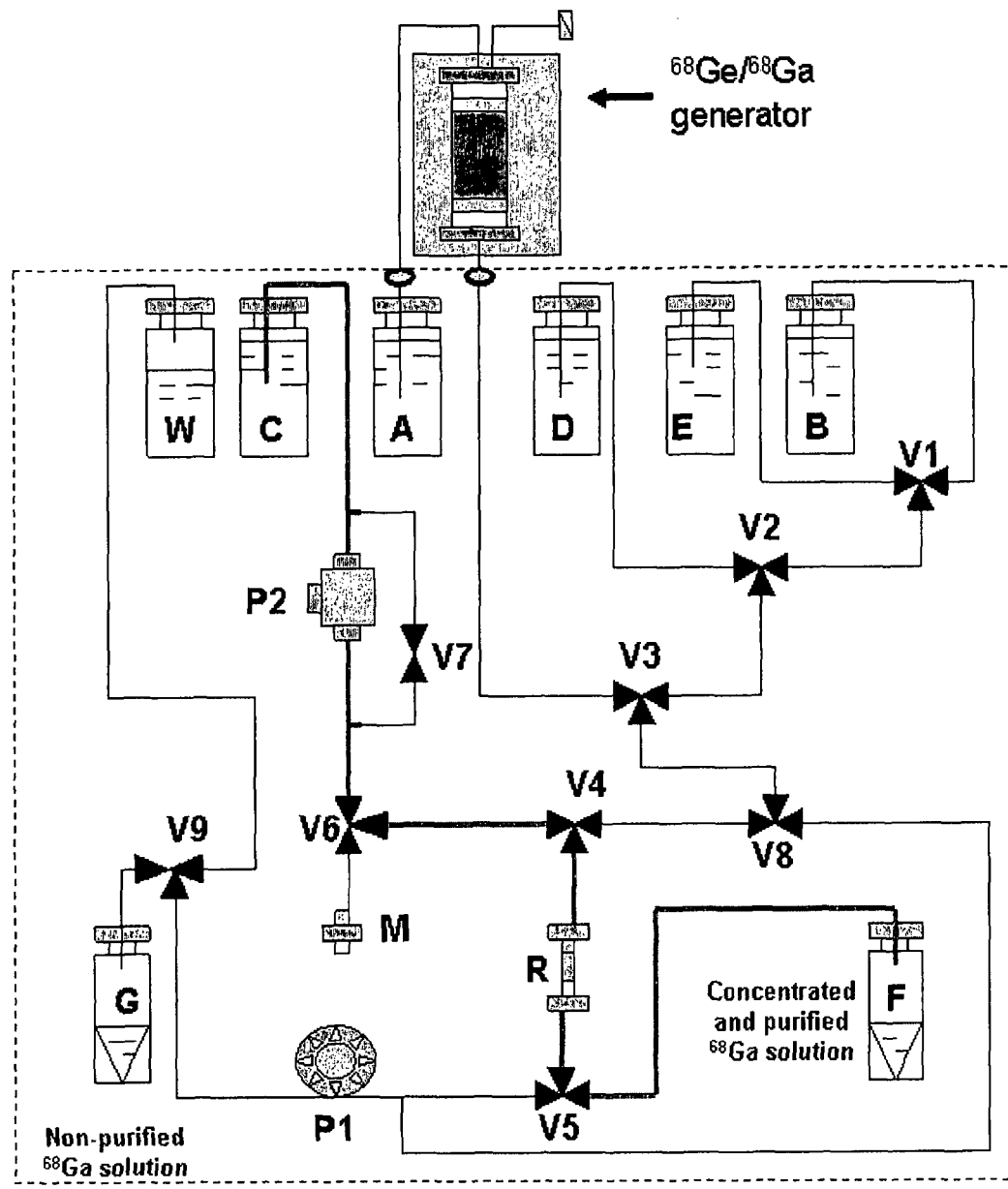
FIG. 7: Illustrates step 5 in the $^{68}$Ga eluate purification (thicker solid lines denote the liquid flow path starting from reservoir C).

FIG. 7 illustrates step 5 (OP5) in the $^{68}$Ga eluate purification and concentration. In this step a small volume of either alkali or acidic solution or a solution of a complexing agent passes under the effect of micro pump P2 through a cationic exchanger resin column to elute $^{68}$Ga into a finished product container F as the concentrated and purified $^{68}$Ga solution. In this step valve V7 is closed (off), V6 is on, V4 is on and V5 is on. Also, replacement micro pump P2 is on. Flow of solution C (either alkali or acidic solution or complexing agent) starts from the reservoir C under the effect of micro pump P2. It then passes via valves V6 and V4 through cation exchanger resin column R, then through valve 5 to product container F, so as to elute the $^{68}$Ga from column R into product container F as the concentrated and purified $^{68}$Ga solution.

Figure 8:
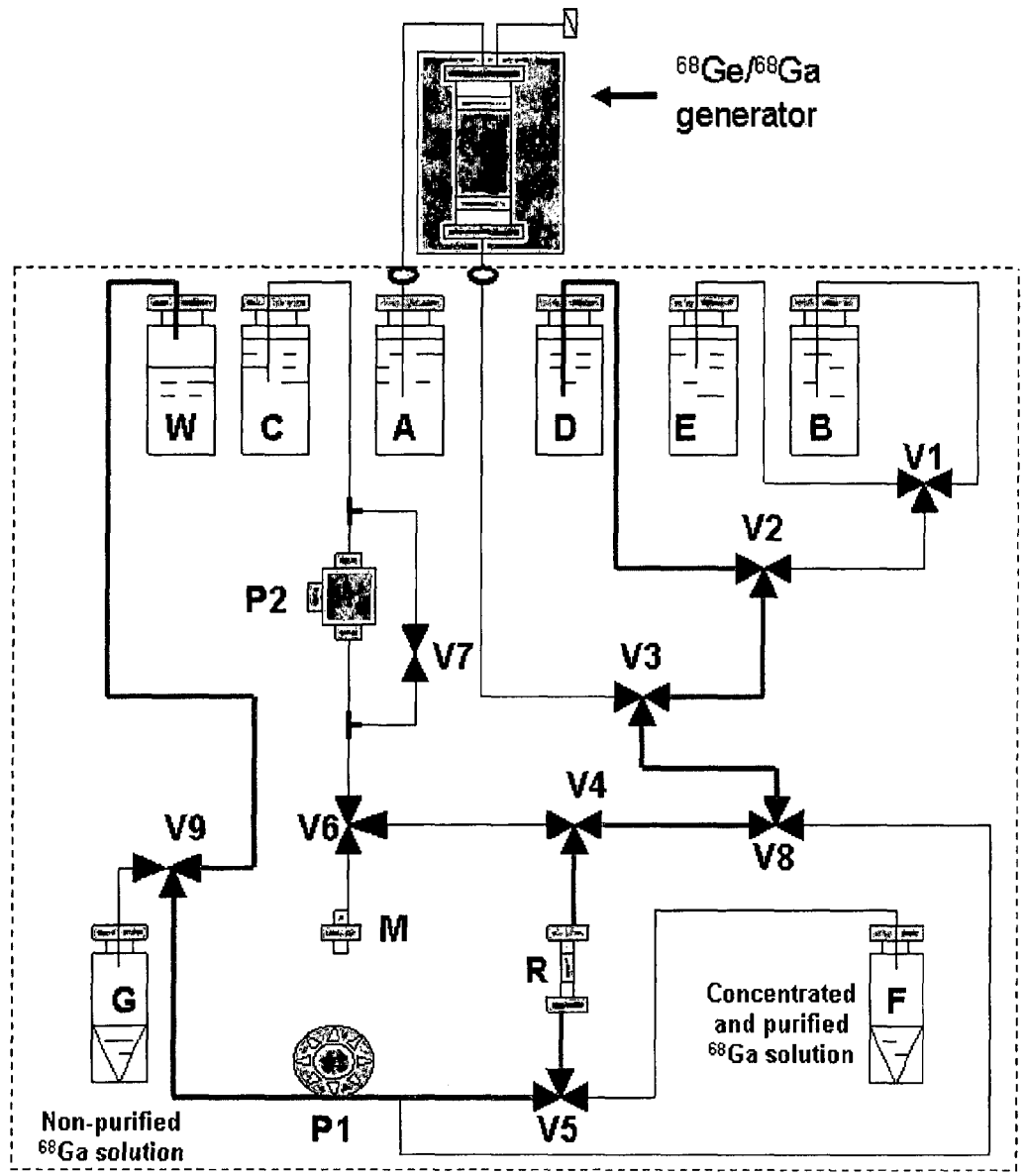
FIG. 8: Illustrates step 6 in the $^{68}$Ga eluate purification (Thicker solid lines denote the liquid flow path starting from reservoir D).

FIG. 8 illustrates step 6 (OP6) in the $^{68}$Ga eluate purification and concentration. In this step a stronger HCl solution under the effect of a peristaltic pump P1 passes through a cationic exchanger resin column R to remove any strongly retained metal ions into waste to recover the ion exchanger resin column In step 6, valve V2 is on, valve V3 is on, valve V8 is off, V9 is off, valve V4 is off and valve V5 is off. Thus the flow of solution D (a stronger HCL solution) starts from container D under the effect of peristaltic pump P1. It passes via valves V2, V3, V8 and V4 through cation exchanger resin column R. It then passes out of column R via valve V5 to waste container W so as to remove any strongly retained metal ions and to recover the ion exchanger resin column to its acidic form.

Figure 9:
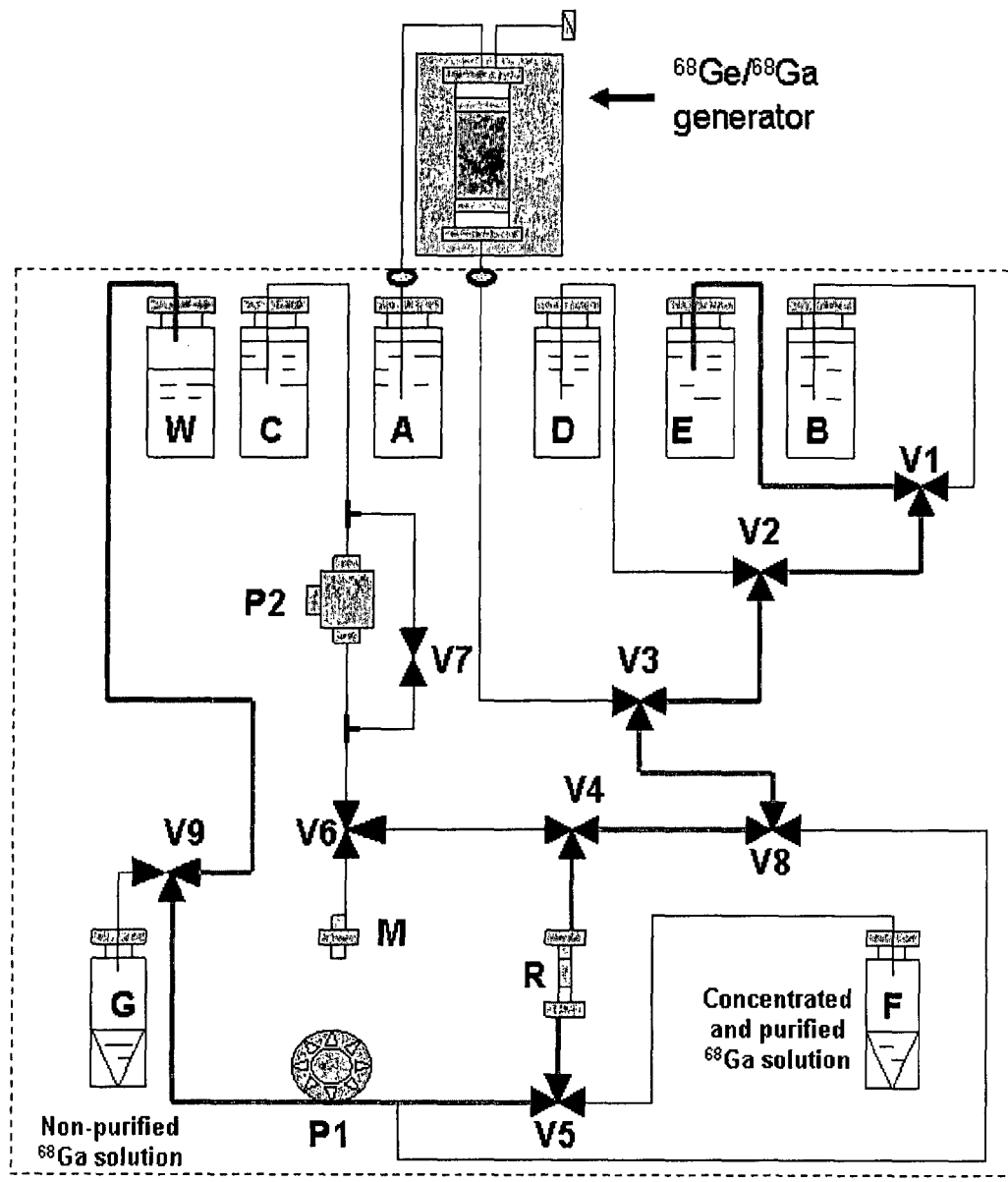
FIG. 9: Illustrates step 7 in the $^{68}$Ga eluate purification (Thicker solid lines denote the liquid flow path starting from reservoir E).

FIG. 9 illustrates step 7 (OP7) in the $^{68}$Ga eluate purification and concentration. In this step distilled water passes under the effect of peristaltic pump P1 through cationic exchanger resin column R to remove HCl solution into waste so as to recondition the ion exchange resin column for a new operation cycles. In this step, V1 is on, V2 is off, V3 is on, V8 is off, V9 is off, V4 is off and V5 is off. Thus flow of liquid E (distilled water) starts from the container E under the effect of peristaltic pump P1. It passes via valves V1, V2, V3 and V4 through cation exchanger resin column R, and then flows out of column R via valve V5 to waste container W so as to remove HCl solution from column R and recondition the cation exchanger resin in column R in preparation for a new operation cycle.

FIG. 10 illustrates an optional operation, using the $^{68}$Ga eluate purification and concentration apparatus. In this step $^{68}$Ga eluate in 0.1 M HCl solution is directly eluted from the $^{68}$Ga generator under the effect of a peristaltic pump P1 into non-purified $^{68}$Ga solution container G. In this operation, valve V3 is off, valve V8 is on and valve V9 (being present) is on (i.e. open). In this mode of operation, flow of solution A starts from reservoir A and passes through the sorption column. $^{68}$Ga eluate in 0.1 M HCl solution passes under the effect of peristaltic pump P1 via valves V3 and V8, by-passing column R and through valve V9 into container G. This mode deposits unpurified $^{68}$Ga solution into container G if/when required.

It should be noted in the above operation that the normal (off) positions of the various valves are designed so as to avoid accidental contamination of container F. Thus for example, V4 in its normal off position diverts unpurified $^{68}$Ga solution to column R and to waste container W. Valve 5 in its normal off position directs eluate from column R to waste container W. It is necessary to have both of these valves in the on position in order to pass purified $^{68}$Ga solution to container F. In some embodiments of the invention valve V8 is not present. In this case the outlet from V3 connects directly to an inlet to V4 such that when V4 is in the off position the outlet from V3 passes through V4 to the inlet to the resin column R. In this case, the by-pass line past the resin column R is not present.

FIG. 11 illustrates an LED panel on the apparatus of the invention. The LED panel indicates which valves and pumps are operating at any particular time. In FIG. 11, the indicator lights for the valves and pumps are shown for the different stages of operation as described above. Filled in indicators are used to indicate that an LED light is on, and that the relevant valve and/or pump is on. Open indicators are used to indicate that an LED light is off, and that the relevant valve and/or pump is off. Thus, for example, during step OP1, when gallium is eluted from the sorbent column onto the resin column, only valve V7 is on and only pump P1 is operating. The remaining valves are in the off position. In the example panel shown in FIG. 11, valve V8 is not present (as described in an option above), and V3 is connected directly to V4.

Table 1 below shows the timing of the various operations in the method.

As can be seen from Table 1, the entire method may be conducted in about 12.5 minutes, and milking of gallium from the apparatus in about 8.9 minutes (the remaining 3.6 minutes being occupied by returning the resin column to a condition for recommencing the method).

Figure 12A:
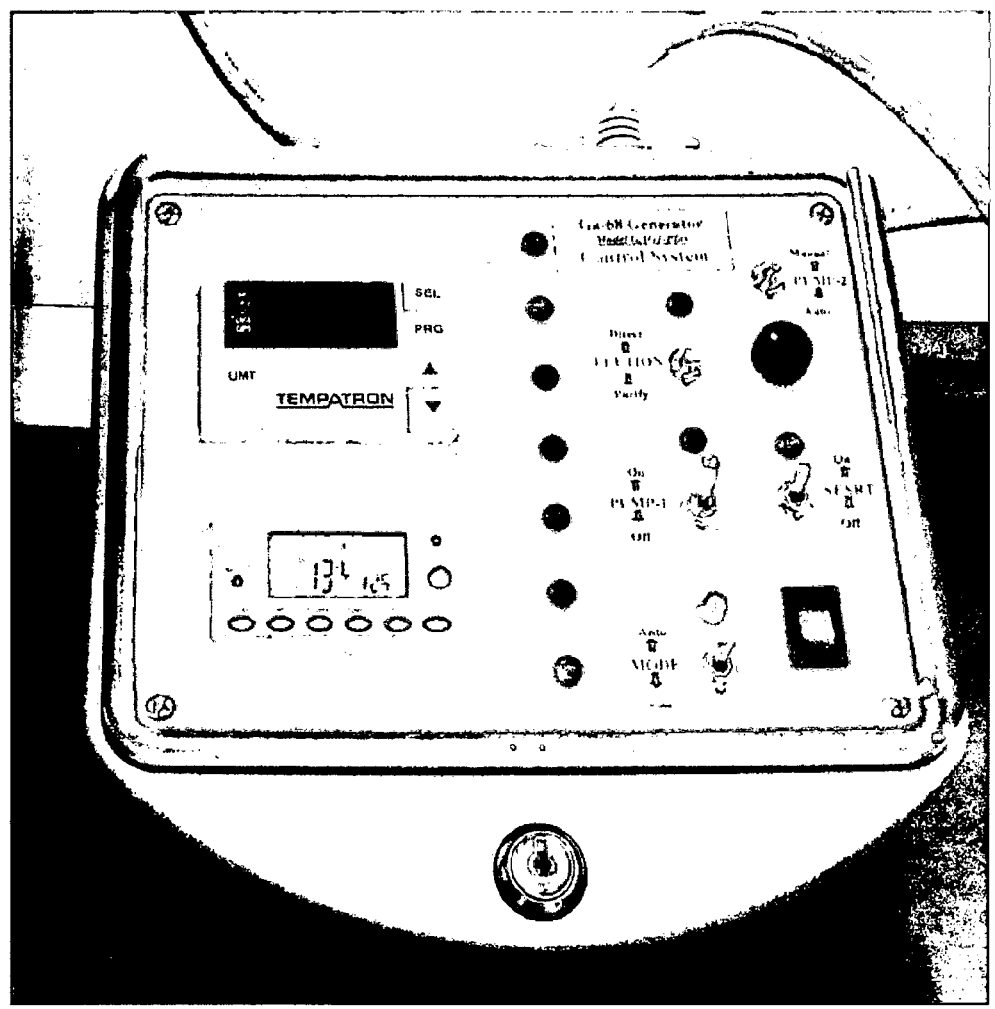
FIG. 12: Photographs of the $^{68}$Ga generator/$^{68}$Ga purification apparatus of the invention. In photograph A the apparatus is shown with its case open. In photograph B the apparatus is shown closed. The control unit of the apparatus and the cylindrical housing for the purified $^{68}$Ga solution container may be seen to the bottom left of photograph B.
Figure 12B:
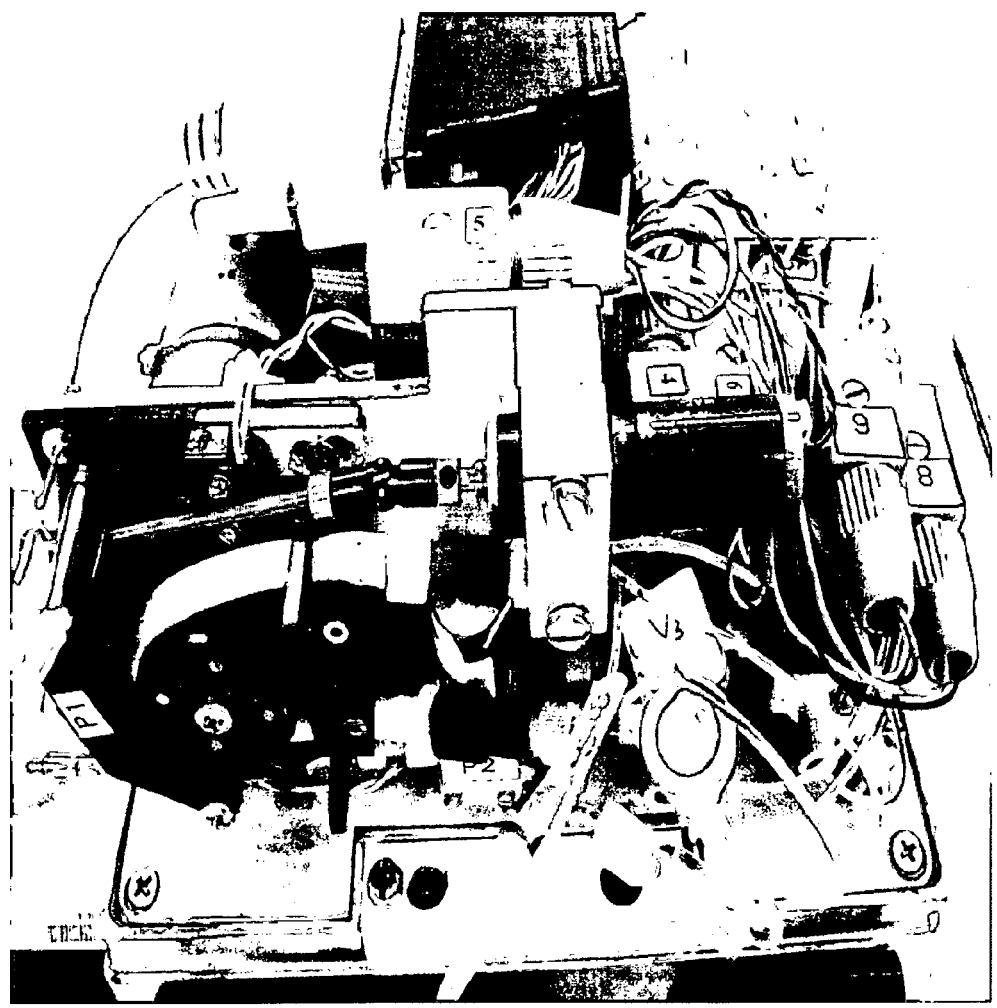

FIG. 12 shows photographs of the apparatus of the invention. In photograph A the to apparatus is shown with its case open. On the right can be seen the containers for the liquids/solutions used in the method and on the left can be seen the pumps and valves that operate the method. At the top left is a cylindrical structure which houses the cation exchange resin column onto which the $^{68}$Ga is sorbed. In photograph B the apparatus is shown closed, illustrating that it is a compact, portable device. Located beside the is apparatus can be seen the controller which controls operation of the apparatus, and the cylindrical housing for the purified $^{68}$Ga solution container, illustrating that this is detachable from the apparatus and may be transported as a separate item to a remote radiopharmaceutical preparation site.

Figure 13:
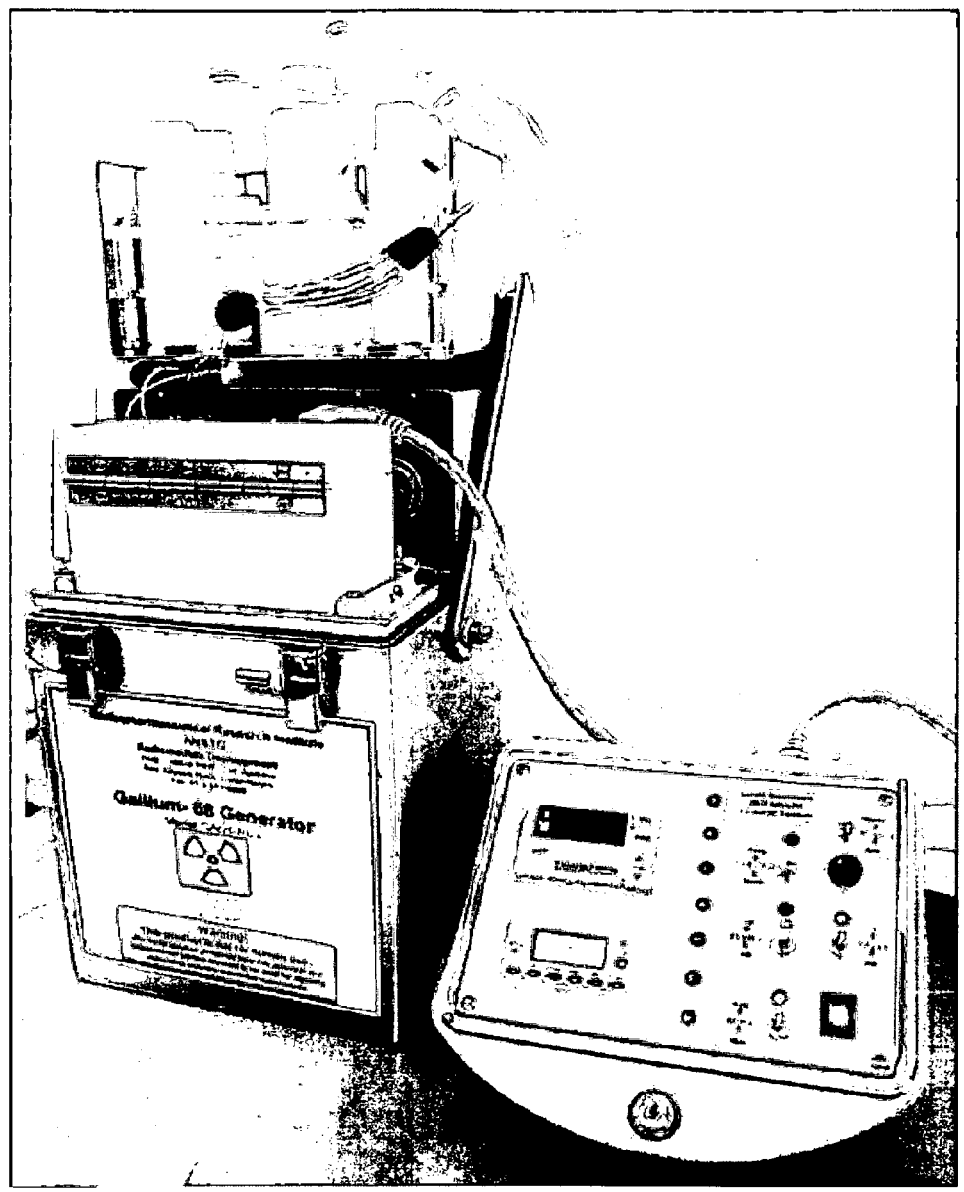
FIG. 13: Photograph of the apparatus in operation. At the top can be seen the containers for the liquids/solutions used in the method. In the centre at the rear can be seen the valves, pumps etc. which operate the method. To the bottom right of the photograph can be seen the control unit, which is coupled to the pumps, valves etc. by means of a single communication cable. The LED displays and the timing display may be seen on the upper surface of the control unit.

FIG. 13 shows a photograph of the apparatus in operation. At the top can be seen the containers for the liquids/solutions used in the method. In the centre at the rear can be seen the valves, pumps etc which operate the method. As may be seen

TABLE 1

Timing schedule for milking gallium from the apparatus of the invention.

| Operation steps (Time, min) | Solution (Volume, mL; Flow-rate, mL/min) | Eluent | T1 | | T2 | | T3 | T4 | T5 | | |
|---|---|---|---|---|---|---|---|---|---|---|---|
| | | | LED1 | | LED2 | | LED3 | LED4 | LED5 | | |
| | | | $G_{1A}$ | $G_{1B}$ | $G_{2A}$ | | $G_3$ | $G_4$ | $G_5$ | | |
| | | | Recycling | Recycling | Delay on | Recycling | | Delay on | Recycling | | |
| | | | | | | Valve/Pump controlled | | | | | |
| | | | P1 Status (Time, min) | V7 Status (Time, min) | V5 Status (Time, min) | V6 Status (Time, min) | V3 Status (Time, min) | V4 Status (Time, min) | V1 Status (Time, min) | P2 Status (Time, min) | V2 Status (Time, min) |
| 1 (3.8) | 0.1M HCL (6.0; 1.57) | A | Pon (3.8) | Nc (3.8) | No (3.8) | No (3.8) | No (3.8) | No (3.8) | No (3.8) | Poff (3.8) | No (3.8) |
| 2 (1.8) | KCl + Me (4; 2.3) | B | Pon (1.8) | Nc (1.8) | No (1.8) | No (1.8) | Nc (1.8) | No (1.8) | No (1.8) | Poff (1.8) | No (1.8) |
| 3 (1.3) | H$_2$O (3; 2.3) | E | Pon (1.3) | Nc (1.3) | No (1.3) | No (1.3) | Nc (1.3) | No (1.3) | Nc (1.3) | Poff (1.3) | No (1.3) |
| 4 (0.5) | Air (1.15; 2.3) | — | Pon (0.5) | Nc (0.5) | No (0.5) | No (0.5) | Nc (0.5) | Nc (0.5) | Nc (0.5) | Poff (0.5) | No (0.5) |
| 5 (1.5) | 0.5M KOH (0.75; 0.5) | C | Poff (1.5) | No (1.5) | Nc (1.5) | Nc (1.5) | Nc (1.5) | Nc (1.5) | Nc (1.5) | Pon (1.5) | Nc (1.5) |
| 6 (1.3) | 4M HCl (3; 2.3) | D | Pon (1.3) | Nc (1.3) | No (1.3) | No (1.3) | Nc (1.3) | No (1.3) | Nc (1.3) | Pon (1.3) | Nc (1.3) |
| 7 (2.3) | H$_2$O (5.3; 2.3) | E | Pon (2.3) | Nc (2.3) | No (2.3) | No (2.3) | Nc (2.3) | No (2.3) | Nc (2.3) | Poff (2.3) | No (2.3) |
| | Total: 12.5 min. (For product: 8.9 min. Recovering: 3.6 min.) | | Total 12.5 min | Total 12.5 min | Total 12.5 min | Total 12.5 min. | Total 12.5 min | Total 12.5 min | Total 12.5 min | Total 12.5 min | Total 12.5 min |
| | Timer setting | | T1: 7.4 min →1.5 min. →7.4 min. | | T2: 3.8 min. | | T3: 6.9 min →2.0 min →6.9 min | T4: 5.6 min | T5: 7.4 min →2.8 min →7.4 min | | |

Note:
Pon: Pump is switched on; Poff: Pump is switched off.
Nc: Valve is opened when power is on;
No: Valve is opened when power is off.

in the photograph these are enclosed in a housing. This provided a safety backup in case of a leak of liquid during operation of the apparatus. In the centre at the front may be seen the cylindrical structure which houses the purified Ga-68 product container and the cation exchange resin column. To the bottom right of the photograph can be seen the control unit, which is coupled to the pumps, valves etc. by means of a single communication cable. The LED displays and the timing display may be seen on the upper surface of the control unit.

Figure 14:
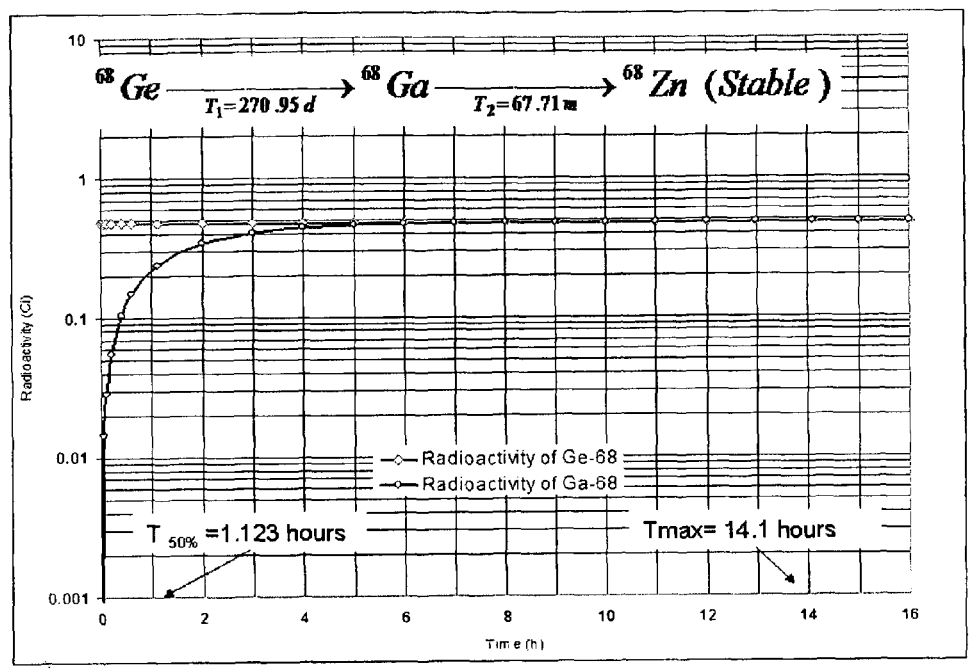
FIG. 14: A graph showing change in $^{68}$Ga radioactivity vs. time and of $^{68}$Ge radioactivity vs. time in a $^{68}$Ge/$^{68}$Ga generator system
Figure 15:
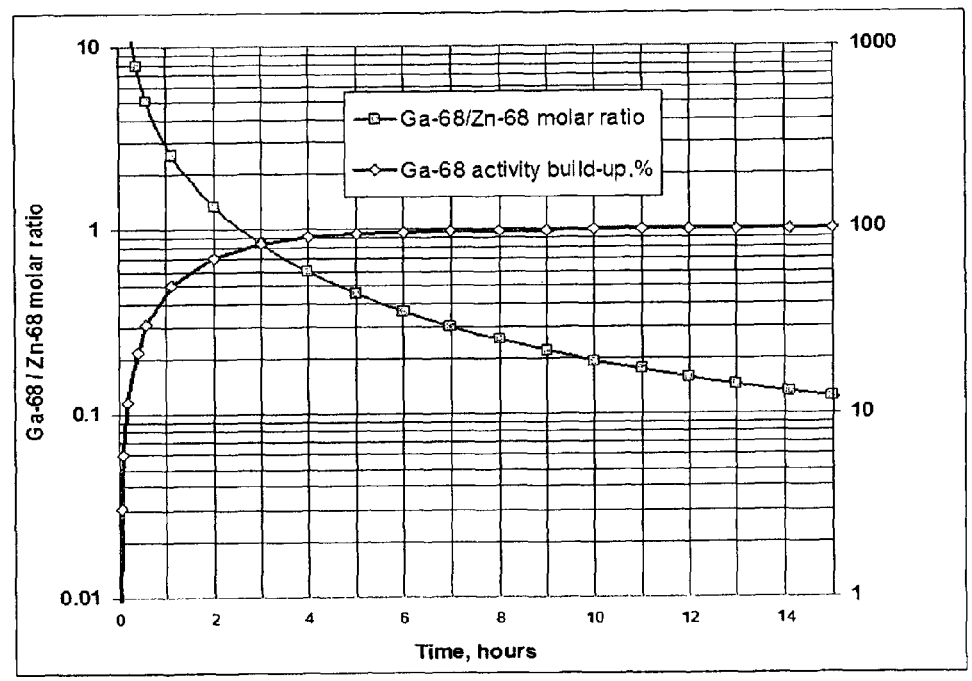
FIG. 15: A graph showing change in $^{68}$Ga radioactivity vs. time and of $^{68}$Ga/$^{68}$Zn molar ratio vs. time in a $^{68}$Ge/$^{68}$Ga generator system

FIG. 14 shows the change in radioactivity as $^{68}$Ge decays. As the half-life of $^{68}$Ge decay to $^{68}$Ga is about 271 days, over the time span shown in the graph, proportionally very little decay of $^{68}$Ge occurs and hence the radioactivity from the $^{68}$Ge is relatively constant. As the decay occurs, however, $^{68}$Ga is formed and hence the radioactivity from $^{68}$Ga increases. As $^{68}$Ga decays to $^{68}$Zn (a stable isotope) with a relatively short half-life (about 1.1 hours), an equilibrium amount of $^{68}$Ga is approached, due to the constant creation and decay of the $^{68}$Ga. As shown in the graph of FIG. 14, the maximum $^{68}$Ga radioactivity is reached at about 14.1 hours. This is further illustrated in FIG. 15, which shows the Ga/Zn ratio, showing that over time, $^{68}$Ga decays to $^{68}$Zn.

Figure 16:
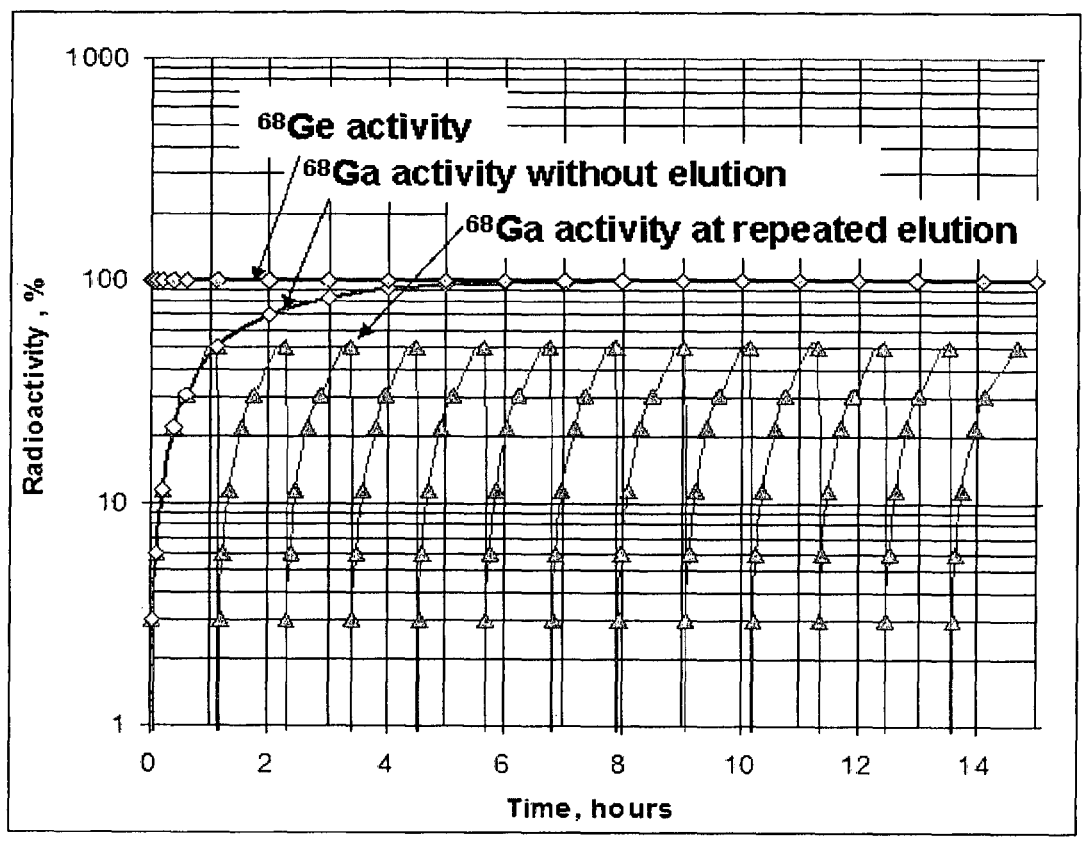
FIG. 16: A graph showing change in $^{68}$Ga radioactivity at repeated elution performance for an improvement in the quality of $^{68}$Ga solution ($^{68}$Ga/$^{68}$Zn molar ratio is approx. 3) and for reduction of the $^{68}$Ga cost.

As a consequence of the fact that the rate of increase of $^{68}$Ga decreases over time, the inventor has found that an efficient mode of operation involves allowing only partial evolution of $^{68}$Ga prior to milking it from the system rather than waiting for extra time to allow for the maximum amount of $^{68}$Ga to build up prior to milking. This is illustrated in FIG. 16. Thus in one mode of operation, $^{68}$Ga is milked after approximately 1 half-life, then allowed to accumulate for a further 1 half-life before a second milking etc. Advantages of the repeated elution performed at the 50% $^{68}$Ga build-up include improvement in the quality of $^{68}$Ga solution ($^{68}$Ga/$^{68}$Zn molar ratio is approx. 3), cost-effective utilisation of the apparatus (total useful $^{68}$Ga radioactivity gathered in 12 repeated elutions was about 6 times higher than that eluted one time at time $T_{max}$); good conformation to PET imaging process in term of time scheduling and low radiation exposure dose to operators.

Table 2, below, shows a comparison of the present invention with prior art devices. The present invention provides improved elution yield, lower $^{68}$Ge breakthrough, a more benign medium for the purified $^{68}$Ga, automated operation and longer useful life.

TABLE 2

Performance of $^{68}$Ga generator/$^{68}$Ga purification and concentration system and comparison

| | Present invention Direct elution | Present invention After purification | Earlier device Direct elution | Earlier device After purification |
|---|---|---|---|---|
| $^{68}$Ga elution yield, % | 73-80 | 65.7-72.0 | 70-75 | 56.0-67.5 |
| $^{68}$Ge breakthrough, % | $3 \times 10^{-4}$ | Not detected | $3.3 \times 10^{-3}$ | <0.1 Bq |
| $^{68}$Ga solution | 0.1M HCl | 0.5M NaCl or Na-Acetate buffer | 0.1M HCl | 0.05M HCl +98% Acetone |
| Volume A, mL | 5 mL | — | 5 mL | — |
| Volume P, mL | — | 0.5 mL-1.0 mL | — | 0.5 mL |
| Operation mode | Automatic | Automatic | Manual | Manual |
| Guaranteed useful life | 1.5 year or 500 elutions | 1.5 year or 500 elutions | 1 year or 300 elutions | 1 year or 300 elutions |

Table 3 shows a comparison of the levels of impurities achievable by the present invention in comparison with an earlier device currently in use.

TABLE 3

Typical levels of impurities in $^{68}$Ga solutions produced from $^{68}$Ga generator/$^{68}$Ga purification and concentration system and comparison

| Metallic impurity | Present invention - direct elution, (µg/L) | Present invention - after purification (µg/L) | Earlier device - direct elution (µg/L) | Earlier device - after purification (µg/L) |
|---|---|---|---|---|
| Fe(III) | 90 | <10 | 2100 | 17.6 |
| Zn(II) | 20 | <10 | 5050 | 52.7 |
| Ti(VI) | 280 | <10 | 14.7 | 3.1 |
| Zr(IV) | 7 | 0 | Not available | Not available |
| Al(III) | 30 | <10 | 1080 | 9.1 |
| Co(II) | 3 | 0 | 4.3 | 0.12 |
| Cu(II) | 3 | 0 | 14.5 | 6.5 |
| Ni(II) | 30 | 0 | 254 | 0.6 |

The invention claimed is:

1. A method for obtaining purified $^{68}$Ga comprising allowing $^{68}$Ge to reside in and/or on a sorbent for sufficient time for conversion of a portion of the $^{68}$Ge to $^{68}$Ga, said sufficient time being sufficient for about 50% build-up of $^{68}$Ga, and then conducting the steps of:
   (i) eluting $^{68}$Ga from the sorbent in and/or on which are sorbed $^{68}$Ga and $^{68}$Ge, so as to generate a crude $^{68}$Ga solution, said sorbent having a higher affinity for $^{68}$Ge than for $^{68}$Ga;
   (ii) applying the crude $^{68}$Ga solution to a medium cation exchange resin;
   (iii) eluting the resin with an aqueous alcohol which comprises a reducing agent, so as to retain the $^{68}$Ga on the resin and remove unwanted species from the resin; and
   (iv) eluting the resin with an eluent so as to obtain an eluate comprising purified $^{68}$Ga ions, said eluent being selected from the group consisting of an alkaline solution and a solution of a species capable of complexing $^{68}$Ga ions.

2. The method of claim 1 wherein the sufficient time is about 50 to about 75 minutes.

3. The method of claim 1 comprising loading the $^{68}$Ge into and/or onto the sorbent from a cyclotron-produced carrier-free $^{68}$Ge stock solution reservoir.

4. The method of claim 1 wherein the eluting of step (i) uses an aqueous acidic solution.

5. The method of claim 1 wherein the sorbent is an inorganic sorbent.

6. The method of claim 1 wherein the aqueous alcohol comprises a dissolved salt.

7. The method of claim 6 wherein the dissolved salt is a halide salt which is soluble in the aqueous alcohol.

8. The method of claim 7 wherein the halide salt is potassium chloride, sodium chloride, lithium chloride, or a mixture of any two of these.

9. The method of claim 1 wherein the aqueous alcohol is acidic.

10. The method of claim 9 wherein the aqueous alcohol has a pH of less than 2.

11. The method of claim 9 wherein the aqueous alcohol comprises hydrochloric acid.

12. The method of claim 1 wherein the alcohol is methanol, ethanol, or a mixture of these.

13. The method of claim 1 wherein the reducing agent is ascorbic acid or potassium iodide.

14. The method of claim 1 additionally comprising neutralizing or acidifying the eluate comprising purified $^{68}$Ga ions.

15. The method of claim 1 wherein the eluate comprises no $^{68}$Ge detectable by gamma-ray spectroscopy.

16. The method of claim 1 which is automated.

17. The method of claim 1 comprising preparing a radiopharmaceutical preparation from the eluate comprising purified $^{68}$Ga ions.

* * * * *